(12) United States Patent
Tanaka et al.

(10) Patent No.: US 8,537,896 B2
(45) Date of Patent: Sep. 17, 2013

(54) IMAGE PROCESSING APPARATUS AND IMAGE PROCESSING METHOD

(75) Inventors: Junichi Tanaka, Kanagawa (JP); Yoichi Yagasaki, Tokyo (JP); Takuya Kitamura, Tokyo (JP)

(73) Assignee: Sony Corporation, Tokyo (JP)

( * ) Notice: Subject to any disclaimer, the term of this patent is extended or adjusted under 35 U.S.C. 154(b) by 477 days.

(21) Appl. No.: 12/841,661

(22) Filed: Jul. 22, 2010

(65) Prior Publication Data

US 2011/0026597 A1 Feb. 3, 2011

(30) Foreign Application Priority Data

Jul. 29, 2009 (JP) ................................ P2009-176701

(51) Int. Cl.
*H04N 7/12* (2006.01)
(52) U.S. Cl.
USPC ....................................................... 375/240.16
(58) Field of Classification Search
USPC ....................................................... 375/240.16
See application file for complete search history.

(56) References Cited

U.S. PATENT DOCUMENTS

| 5,491,509 | A | 2/1996 | Jeong et al. |
| 8,218,644 | B1 * | 7/2012 | Jones ........................ 375/240.16 |
| 2008/0008250 | A1 | 1/2008 | Mori et al. |
| 2008/0317128 | A1 * | 12/2008 | Zhou et al. ............... 375/240.16 |

FOREIGN PATENT DOCUMENTS

| JP | 06-038194 | 2/1994 |
| JP | 7-59085 | 3/1995 |
| JP | 08-126004 | 5/1996 |
| JP | 11-41609 | 2/1999 |
| JP | 11-205803 | 7/1999 |
| JP | 2008-17229 | 1/2008 |
| JP | 2008-017229 | 1/2008 |
| JP | 2009-021908 | 1/2009 |
| WO | WO 2009/044475 | 4/2009 |

OTHER PUBLICATIONS

Jan. 15, 2013, Japanese Office Action issued for related application No. JP 2009-176701.

* cited by examiner

*Primary Examiner* — Richard Torrente
(74) *Attorney, Agent, or Firm* — Sherr & Jiang, PLLC

(57) ABSTRACT

An apparatus and method provide logic for processing an image. In one implementation, a computer-implemented method is provided to process an image. The method receives information associated with pixels of the image disposed in pixel blocks, and selects one of the pixel blocks as a target block. A motion vector associated with a translation of pixels of a portion of the target block from reference positions in a previously-encoded image is computed at less than integer precision. The method computes predicted image data for the pixels of the target block based on at least the received information and the motion vector, and filters the predicted image data according to a predetermined process. The predetermined process is applied to predicted image data associated with pixels adjacent to a boundary pixel of the target block.

6 Claims, 24 Drawing Sheets

FIG. 4A
FIG. 4B
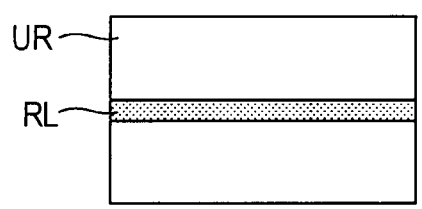
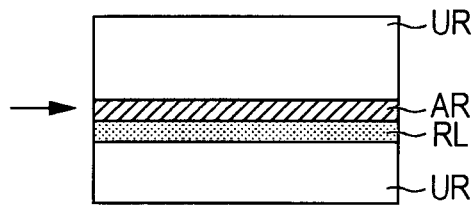
FIG. 5
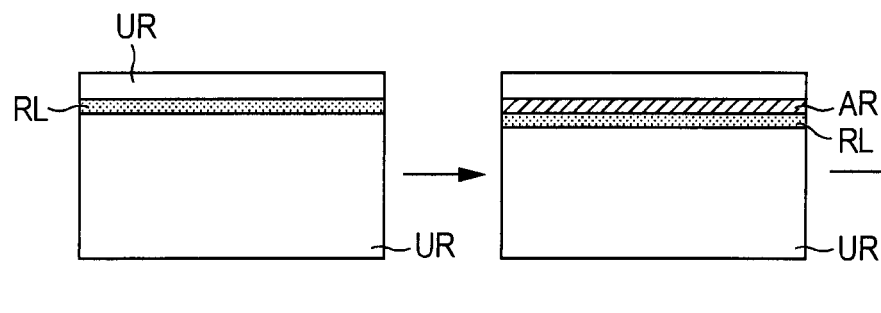
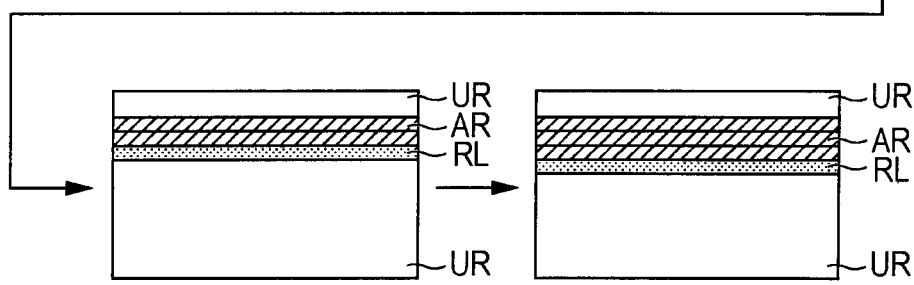

FIG. 7A
Mode 0

FIG. 7B
Mode 1

FIG. 7C
Mode 2

FIG. 7D
Mode 3

FIG. 7E
Mode 4

FIG. 7F
Mode 5

FIG. 7G
Mode 6

FIG. 7H
Mode 7

FIG. 7I
Mode 8

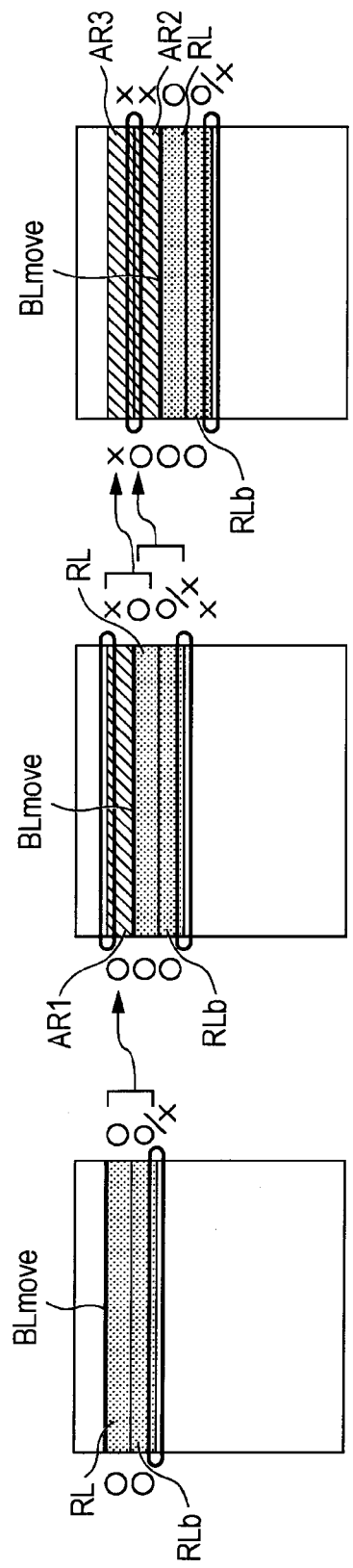

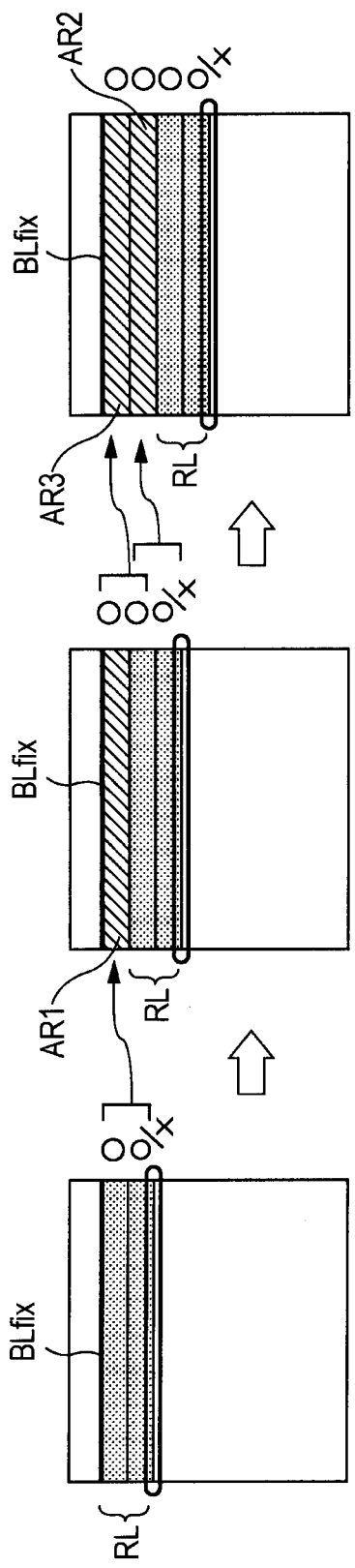

FIG. 19A
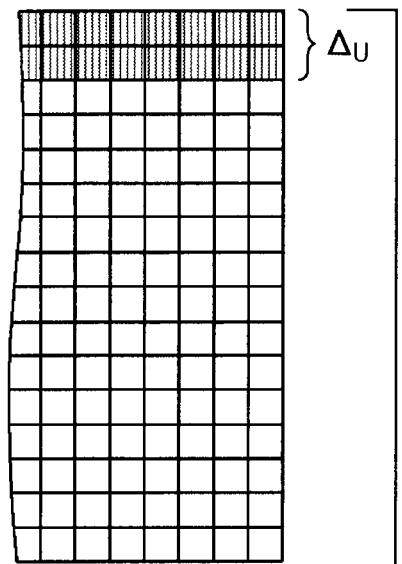
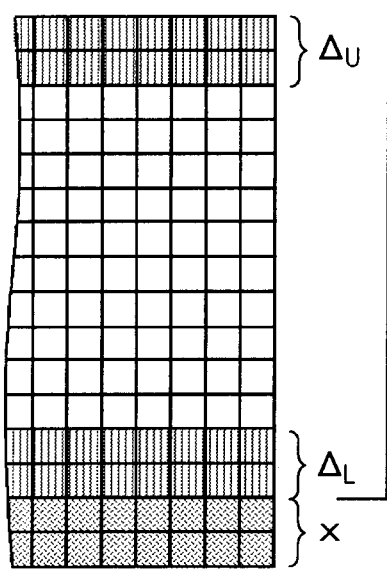
FIG. 19B
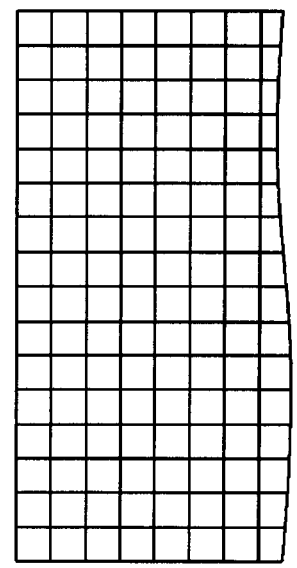

IMAGE PROCESSING APPARATUS AND IMAGE PROCESSING METHOD

CROSS-REFERENCE TO RELATED APPLICATIONS

This application is based upon and claims the benefit of priority from Japanese Patent Application No. 2009-176701, filed Jul. 29, 2009, the entire contents of which are incorporated herein by reference.

BACKGROUND OF THE INVENTION

1. Field of the Invention

The present invention relates to an image processing apparatus and an image processing method, and more particularly, to an encoding apparatus capable of encoding image data delivered in a digital terrestrial broadcast, for example.

2. Description of the Related Art

In the past, there was developed a wireless transmission technology wirelessly transmitting HD (High Definition) video data to a display apparatus, such as a wall-hung television, located distantly. As a transmission method using this wireless transmission technology, millimeter waves using the 60 GHz band, IEEE 802.11n (wireless LAN (Local Area Network)) using the 5 GHz band, UWB (Ultra Wide band), etc. are exemplified.

In the wireless transmission technology, HD video data is compressed by encoding before transmission. In the wireless transmission technology, it is preferable that delay of the transmission of the HD video data to the display of the HD video data on a display apparatus is reduced as much as possible to realize the real-time display of a broadcast program in a digital terrestrial broadcast.

For example, in an encoding method of changing I, P, and B pictures in each picture, the encoding amount of I picture is larger than that of the other pictures. For this reason, when this encoding method is applied to the wireless transmission technology, it is necessary to buffer data in a GOP (Group Of Picture) unit with a uniform encoding amount, and thus the delay is also increased.

In order to solve this problem, there has been suggested an image processing apparatus which encodes and transmits the HD video data by an intra slice method using MPEG (Moving Picture Experts Group)-2, as shown in FIG. 1 (for example, see Japanese Unexamined Patent Application Publication No. 11-205803).

In the intra slice method using MPEG-2, pictures include I picture regions I_MB subjected to intra encoding and P picture regions P_MB subjected to forward prediction encoding. In the intra slice method, an I picture region (hereinafter, referred to as a refresh line) RL formed by a predetermined MB line number for one picture emerges. The refresh lines RL are sequentially shown in a deviated manner and are shown in all of the pictures in a period T.

Therefore, the intra slice method can reduce the delay from the transmission of the HD video data to the display of the HD video data on a display apparatus as small as possible, since the encoding amount of each picture can be made uniform.

SUMMARY

In recent years, a method of transmitting HD video data wirelessly using IEEE 802.11n has become popular as a transmission method using IEEE 802.11n has been used widely.

However, when IEEE 802.11n is used, a transmission band of 100 Mbps or less is mainly used. In the above-mentioned intra slice method using MPEG-2, compression efficiency is low and it is difficult to transmit data at a bit rate of 100 Mbps or less.

Therefore, it is preferable to use H.264/AVC (Advanced Video Coding) as its compression efficiency is higher than the intra slice method. However, H.264/AVC is different from MPEG-2, since a quarter pixel is generated in motion prediction and use of a deblocking filter is assumed. Therefore, when the intra slice method is used without modification, a problem may arise in that the propagation of errors may not be prevented due to the difference between H.264/AVC and MPEG-2 and the time necessary for the recovery from the error.

It is desirable to provide an image processing apparatus and an image processing method capable of shortening the time necessary for the recovery from the error upon decoding.

In the image processing apparatus having such a configuration, it is possible to prevent propagation of an error caused in a motion prediction process and the deblocking filter process upon decoding.

In the image processing method, it is possible to prevent propagation of the error caused in the motion prediction process and the deblocking filter process upon decoding.

According to the exemplary embodiments, it is possible to prevent propagation of errors in decoding caused by a motion prediction process and a deblocking filter process. Therefore, according to the exemplary embodiments, it is possible to realize the image processing apparatus and the image processing method capable of shortening the time necessary for the recovery from the error.

Consistent with an exemplary embodiment, a computer-implemented method processes an image. The method includes receiving information associated with a plurality of pixels of the image. The pixels are disposed within a plurality of pixel blocks. The method selects one of the pixel blocks as a target block, and computes a motion vector associated with a translation of pixels of a portion of the target block from reference positions in a previously-encoded image. A portion of the pixels of the previously-encoded image is selected as a search range. The search range excludes a pixel of the previously-encoded image that constitutes an error. The motion vector is computed within the search range at a precision greater than integer precision. The method computes predicted image data for the pixels of the target block based on at least the received information and the motion vector, and filters the predicted image data according to a predetermined process. The filtering includes identifying a boundary pixel associated with a boundary of the portion of the target block, and an adjacent pixel disposed adjacent to the boundary pixel. The method applies the process to the predicted image data associated with the adjacent pixel.

Consistent with an additional exemplary embodiment, an apparatus processes an image. The apparatus includes a storage device and a processor coupled to the storage device. The storage device stores a program for controlling the processor. The processor, being operative with the program, is configured to cause the apparatus to receive information associated with a plurality of pixels of the image. The pixels are disposed within a plurality of pixel blocks. The apparatus selects one of the pixel blocks as a target block, and computes a motion vector associated with a translation of pixels of a portion of the target block from reference positions in a previously-encoded image. The apparatus selects a portion of the pixels of the previously-encoded image as a search range, and the search range exclude a pixel of the previously-encoded image that constitutes an error. The apparatus computes the motion vector within the search range at a precision greater than integer precision, and computes predicted image data for the pixels of the target block based on at least the received information and the motion vector. The apparatus filters the predicted image data according to a predetermined process. The apparatus identifies a boundary pixel associated with a boundary of the portion of the target block, and an adjacent pixel disposed adjacent to the boundary pixel. The apparatus applies the process to the predicted image data associated with the adjacent pixel.

Consistent with a further exemplary embodiment, a computer-readable medium stores instructions that, when executed by a processor, perform a method for processing an image. The method includes receiving information associated with a plurality of pixels of the image. The pixels are disposed within a plurality of pixel blocks. The method selects one of the pixel blocks as a target block, and computes a motion vector associated with a translation of pixels of a portion of the target block from reference positions in a previously-encoded image. The method selects a portion of the pixels of the previously-encoded image as a search range. The search range excludes a pixel of the previously-encoded image that constitutes an error. The method computes the motion vector within the search range at a precision greater than integer precision, and computes predicted image data for the pixels of the target block based on at least the received information and the motion vector. The method filters the predicted image data according to a predetermined process. The method identifies a boundary pixel associated with a boundary of the portion of the target block, and an adjacent pixel disposed adjacent to the boundary pixel, and applies the process to the predicted image data associated with the adjacent pixel.

BRIEF DESCRIPTION OF THE DRAWINGS

FIGS. 4A and 4B are diagrams for explaining propagation of an error by a motion prediction.

FIG. 5 is a diagram for explaining recovery from the error.

FIGS. 7A to 7I are diagrams for explaining the propagation of an error by an intra prediction of AVC.

FIGS. 16A to 16C are diagrams for explaining displacement of a slice boundary and propagation of an error.

FIGS. 17A to 17C are diagrams for explaining prevention of the propagation of the error by fixing a slice boundary.

FIGS. 19A and 19B are diagrams illustrating a search range according to the second exemplary embodiment.

DESCRIPTION OF THE EXEMPLARY EMBODIMENTS

Figure 1:
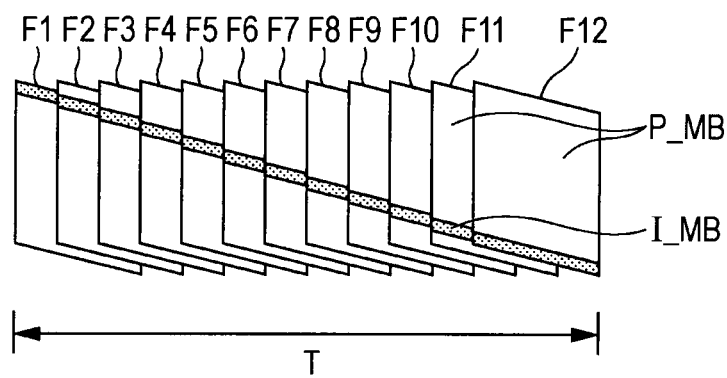
FIG. 1 is an explanatory diagram illustrating an intra slice method.
Figure 2:
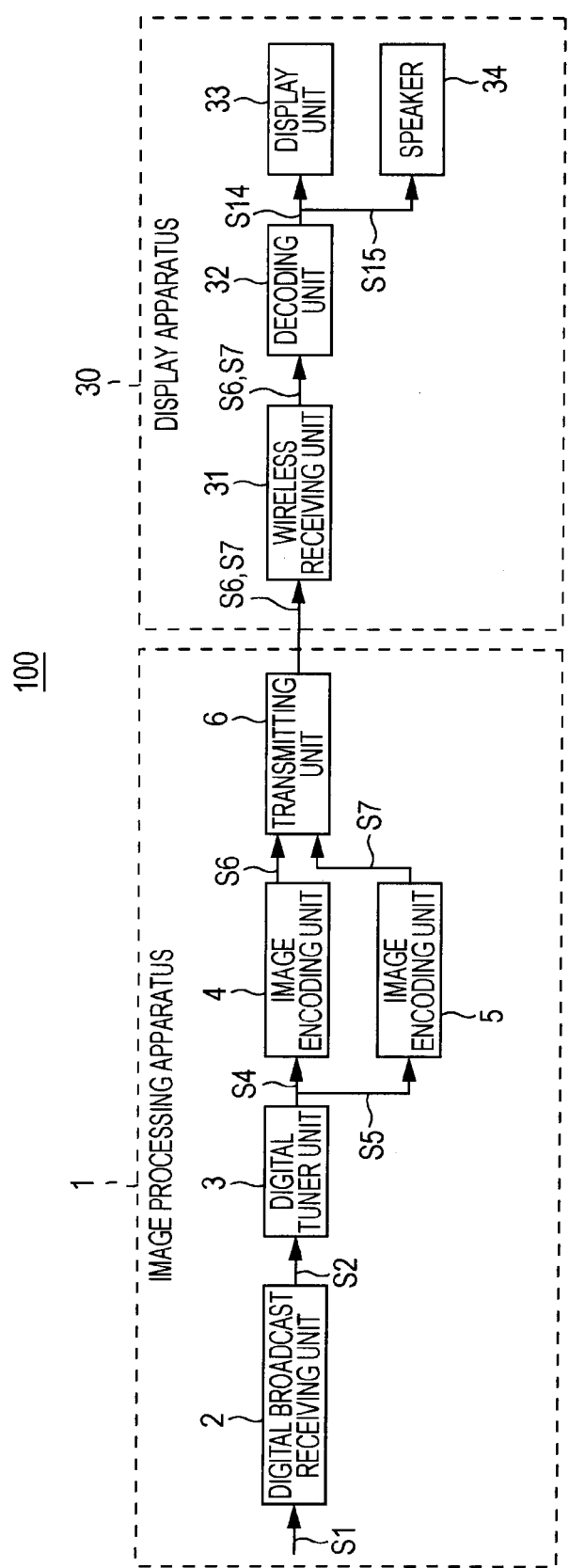
FIG. 2 is a diagram illustrating the configuration of an image processing apparatus and a display apparatus.

Hereinafter, exemplary embodiments will be described in detail with reference to the accompanying drawings. The description is made in the following sequence.
1. First Exemplary Embodiment (AVC Intra Slice Method Using No Deblocking Filter)
2. Second Exemplary Embodiment (AVC Intra Slice Method Using Deblocking Filter)
3. Third Exemplary Embodiment (Random Refresh Method in Which Refresh Block Emerges In Each Macro Block)
4. Fourth Exemplary Embodiment (Random Refresh Method in Which Refresh Block Emerges In Plurality of Macro Blocks)
5. Fifth Exemplary Embodiment (Use of Deblocking Filter in Random Refresh Method)
6. Other Exemplary Embodiments
1. First Exemplary Embodiment
1-1. Configuration of Image Processing Apparatus In FIG. 2, Reference Numeral 100 denotes a wireless image data transmitting system. The wireless image data transmitting system 100 is a wall-hung television capable of receiving broadcast signals such as digital terrestrial broadcast, for example. The wireless image data transmitting system 100 includes an image processing apparatus 1 and a display apparatus 30.

The image processing apparatus 1 receives broadcast signals S1, encodes image data obtained from the broadcast signals S1 in conformity with H.264/AVC, and generates a bit stream S6. The image processing apparatus 1 wirelessly transmits the bit stream S6 and encoding voice data S7 obtained by encoding voice data to the display apparatus 30. The display apparatus 30 decodes and output the bit stream S6 and the encoding voice data S7. As a consequence, the display apparatus 30 enables viewers to watch broadcast program contents based on the digital terrestrial digital broadcast or the like.

Since a digital broadcast receiving unit 2 is connected to an antenna or a network such as the Internet, the digital broadcast receiving unit 2 is configured as an external interface receiving the broadcast signals S1 such as the digital terrestrial broadcast. The broadcast signals S1 are encoded in conformity with the MPEG (Moving Picture Experts Group)-2 standard.

When the digital broadcast receiving unit 2 receives the broadcast signals S1 indicating broadcast program contents, the digital broadcast receiving unit 2 supplies the broadcast signals S1 as broadcast signals S2 to a digital tuner unit 3. The digital tuner unit 3 decodes the broadcast signals S2 to generate both image data S4 and voice data S5.

The digital tuner unit 3 supplies the image data S4 and the voice data S5 to an image encoding unit 4 and a voice encoding unit 5, respectively. The image encoding unit 4 encodes the image data S4 (that is, the received information) in conformity with the standard of H.264/AVC (Advanced Video Coding) by an image encoding process, which is described below, to generate a bit stream S6. The image encoding unit 4 supplies the bit stream S6 to a transmitting unit 6.

The voice encoding unit 5 encodes the voice data S5 in conformity with a predetermined encoding method to generate voice code data S7. The voice encoding unit 5 supplies the voice code data S7 to the transmitting unit 6. The transmitting unit 6 transmits the bit stream S6 and the voice code data S7 in conformity with a wireless transmission method such as IEEE 802.11n.

As a consequence, the bit stream S6 and the voice code data S7 are supplied to the display apparatus 30. When a wireless receiving unit 31 of the display unit 30 receives the bit stream S6 and the voice code data S7, the wireless receiving unit 30 supplies the bit stream S6 and the voice code data S7 to a decoding unit 32.

The decoding unit 32 decodes the bit stream S6 and the voice code data S7 to generate image data S14 corresponding to the image data S4 and voice data S15 corresponding to the voice data S5. The decoding unit 32 supplies the image data S14 and the voice data S15 to a display unit 33 and a speaker 24, respectively. As a consequence, an image based on the image data S14 is display on the display unit 33. A voice based on the voice data S15 is output from the speaker 34.

In this way, the image processing apparatus 1 and the display apparatus 30 are configured to transmit and receive the encoded broadcast signals wirelessly.

1-2. Configuration of Image Encoding Unit

Figure 3:
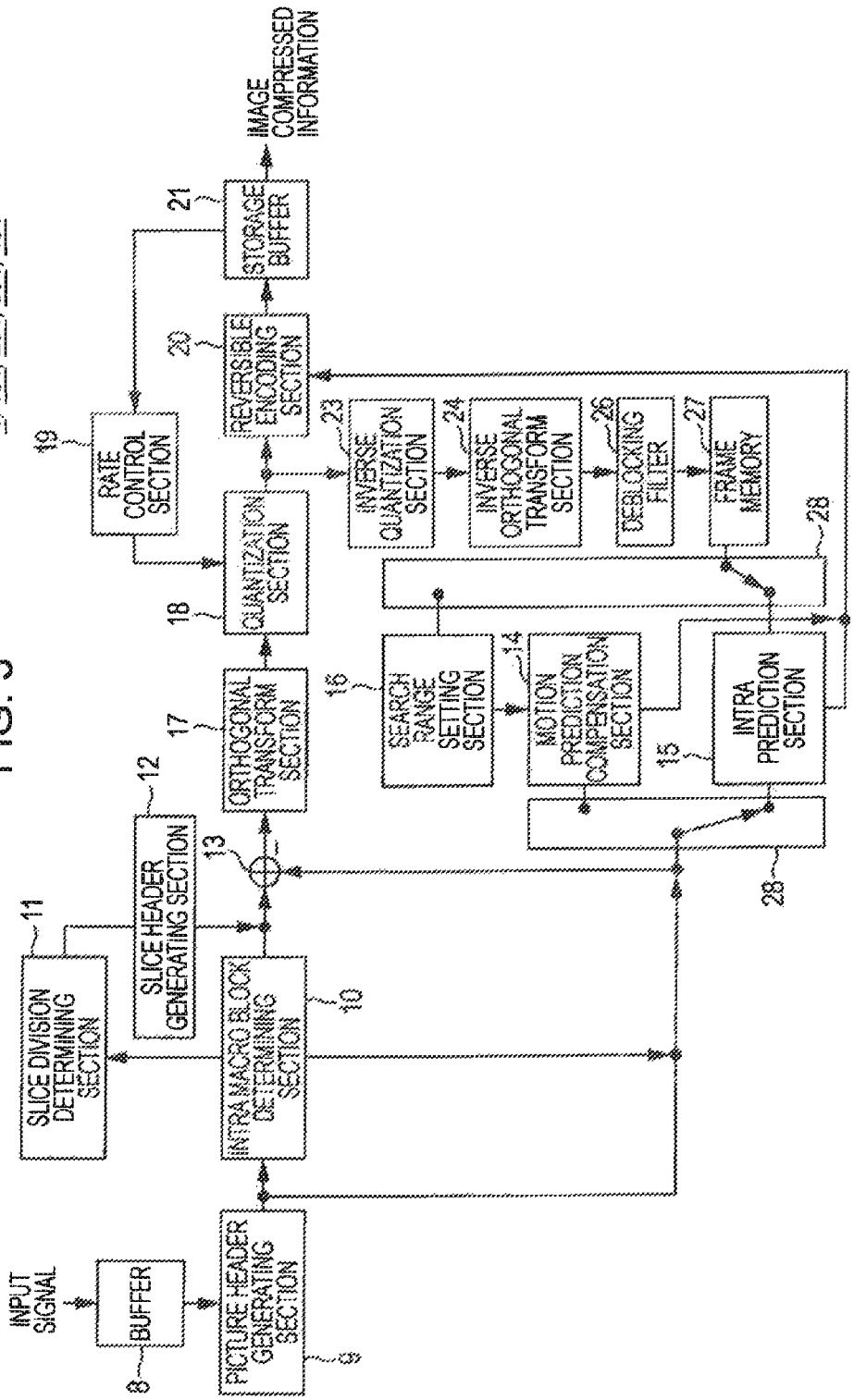
FIG. 3 is a diagram illustrating the configuration of an encoding apparatus.

When the image data S4 is received from the digital tuner unit 3, as shown in FIG. 3, the image encoding unit 4 supplies the image data S4 to a buffer 8.

The buffer 8 supplies the image data S4 to a picture header generating section 9. The picture header generating section 9 generates a picture header to add the picture header to the image data S4. The picture header generating section 9 supplies the image data S4 to an intra macro block determining section 10 and a motion prediction compensation section 14 or an intra prediction section 15. At this time, the picture header generating section 9 adds a flag (that is, an indicator), such as constrained_intra_pred_flag (which is described in detail below).

The intra macro block determining section 10 determines whether to intra-encode each macro block (that is, each target block) into an I macro block or inter-encode each macro block into a P macro block. The intra macro block determining section 10 simultaneously supplies the determination result to a slice division determining section 11, a slice header generating section 12, and a switch 28. The intra macro block determining section 10 supplies the image data S4 to a calculation section 13.

The slice division determining section 11 determines whether to divide slices on the basis of the determination result of the intra macro block determining section 10. The slice division determining section 11 supplies the determination result to the slice header generating section 12.

The slice header generating section 12 generates a slice header to add the slice header to the image data S4. The slice header generating section 12 supplies the image data S4 to the calculation section 13.

When the calculation section 13 inter-encodes the image data S4, the calculation section 13 subtracts a prediction value L5 supplied from the motion prediction compensation section 14 from the image data S4 and supplies the subtracted result as differential data D1 to an orthogonal transform section 17. When the calculation section 13 intra-encodes the image data S4, the calculation section 13 subtracts the prediction value L5 supplied from the intra prediction section 15 from the image data S4 and supplies the subtracted result as the differential data D1 to the orthogonal transform section 17.

The orthogonal transform section 17 executes an orthogonal transform, such as the DCT (Discrete Cosine Transform) transform or the Karhunen-Loeve transform, on the differential data D1 and supplies an orthogonal transform coefficient D2 to a quantization section 18.

The quantization section 18 quantizes the orthogonal transform coefficient D2 by using a quantization parameter QP determined by the control of a rate control section 19 and supplies a quantization coefficient D3 to an inverse quantization section 23 and a reversible encoding section 20. The reversible encoding section 20 executes reversible encoding on the quantization coefficient D3 in accordance with an entropy coding method such as CAVLC (Context-based Adaptive Variable Length Code) or CABAC (Context Adaptive Binary Arithmetic Coding) and supplies reversible encoding data D5 to a storage buffer 21.

The reversible encoding section 20 sets information regarding intra encoding and inter encoding and information acquired from the motion prediction compensation section 14 and the intra prediction section 15 to header information of the reversible encoding data D5.

The storage buffer 21 stores the reversible encoding data D5 and simultaneously outputs the reversible encoding data D5 as a bit stream S6 at a predetermined transmission rate. The rate control section 19 monitors the storage buffer 21 and determines the quantization parameter QP so that the generated code amount of the reversible encoding data D5 is close to a certain code amount for each predetermined control unit (for example, a frame or the GOP).

The inverse quantization section 23 executes inverse quantization of the quantization coefficient D3 to generate a reproduction orthogonal transform coefficient L1 and supplies the reproduction orthogonal transform coefficient L1 to an inverse orthogonal transform section 24. The inverse orthogonal transform section 24 executes inverse orthogonal transform of the reproduction orthogonal transform coefficient L1 to generate reproduction differential data L2. The inverse orthogonal transform section 24 adds image data of a reference target block and the reproduction differential data L2 which are simultaneously supplied, generates the local decode image L3 (that is, the predicted image data), and supplies the local decode image L3 to a deblocking filter 26.

The deblocking filter 26 executes a deblocking filter process on a processing target block and supplies the result to a frame memory 27. As a consequence, the local decoded images L4 subjected to the deblocking filter process are stored in the frame memory 27.

The frame memory 27 supplies the local decoded image L4 corresponding to the reference target block among the local decoded images L4 subjected to the deblocking filter process to the motion prediction compensation section 14 or the intra prediction section 15. At this time, the switch 28 is switched in accordance with the determination result of the intra macro block determining section 10.

The motion prediction compensation section 14 generates the prediction value L5 of the processing target block by making motion prediction about the image data S4 with reference to the local decoded image L4, and supplies the prediction value L5 to the calculation section 13. The intra prediction section 15 generates the prediction value L5 of the processing target block by making the intra prediction about the image data S4 with reference to the local decoded image L4 and supplies the prediction value L5 to the calculation section 13.

In this way, the image encoding unit 4 encodes the image data S4 to generate the bit stream S6.

1.3. Error Propagation Causes Unique to AVC

Hereinafter, first to third propagation causes as error propagation causes unique to the AVC will be described in sequence. The first propagation cause is a search range in detecting a motion vector.

As shown in FIG. 4, the intra slice method using MPEG-2 encodes each picture so that a refresh line RL is displaced by one line. The refresh line RL may be a line for each one macro block (that is, for each target block) or a line for the plurality of macro blocks (that is, for the plurality of target blocks). Hereinafter, a line unit of the refresh line RL is referred to as an encoding line unit. A line in which the macro blocks are arranged in an x direction (horizontal direction) is referred to as a macro block line. One macro block line is a line in which one macro block is arranged.

When an error occurs in one picture upon decoding, as shown in FIG. 4A, only the refresh line RL for the next picture is recovered and the remaining inter encoding regions are an unrecovered line UR.

In the intra slice method, the encoding is executed by moving the refresh line RL immediately before the picture as the search range and detecting a vector. Upon decoding, as shown in FIG. 4B, the next picture can be decoded with reference to only the refresh line RL. Therefore, since the unrecovered line UR is not referenced, a portion corresponding to the refresh line RL of a picture immediately before the reference can be recovered as a recovered line AR.

An encoding apparatus according to a related example which encodes image data in conformity of the intra slice method of MPEG-2 may not recognize whether an error occurs. Accordingly, the encoding apparatus according to the related example which encodes image data in conformity with the intra slice method of MPEG-2 sets a search range of a motion vector so as to typically fall within the range of the encoding line unit. As a consequence, the encoding apparatus according to the related example can set the search range of the motion vector so as to typically fall within the encoding line unit.

As shown in FIG. 5, the recovered line AR increases with emergence of the refresh line RL. When the decoding of only a picture with a period T ends, the emergence of the refresh line RL disappears in all positions. Therefore, an image can be recovered at all of the position in the picture.

In MPEG-2, however, the motion vector is detected with a half-pixel precision. Therefore, in order to generate a half pixel, the encoding apparatus according to the related example uses a FIR (Finite Impulse Response Filter) filter of 2 TAP. Since The FIR filter of 2 TAP refers to an adjacent pixel, an error does not propagate between the refresh line RL and the unrecovered line UR.

In H.264/AVC, the motion vector is detected with a quarter-pixel precision. Therefore, an encoding apparatus executing the encoding process in conformity with H.264/AVC uses an FIR filter of 6 TAP to generate the half pixel and the quarter pixel. The FIR filter of 6 TAP makes reference to six adjacent pixels.

Figure 6:
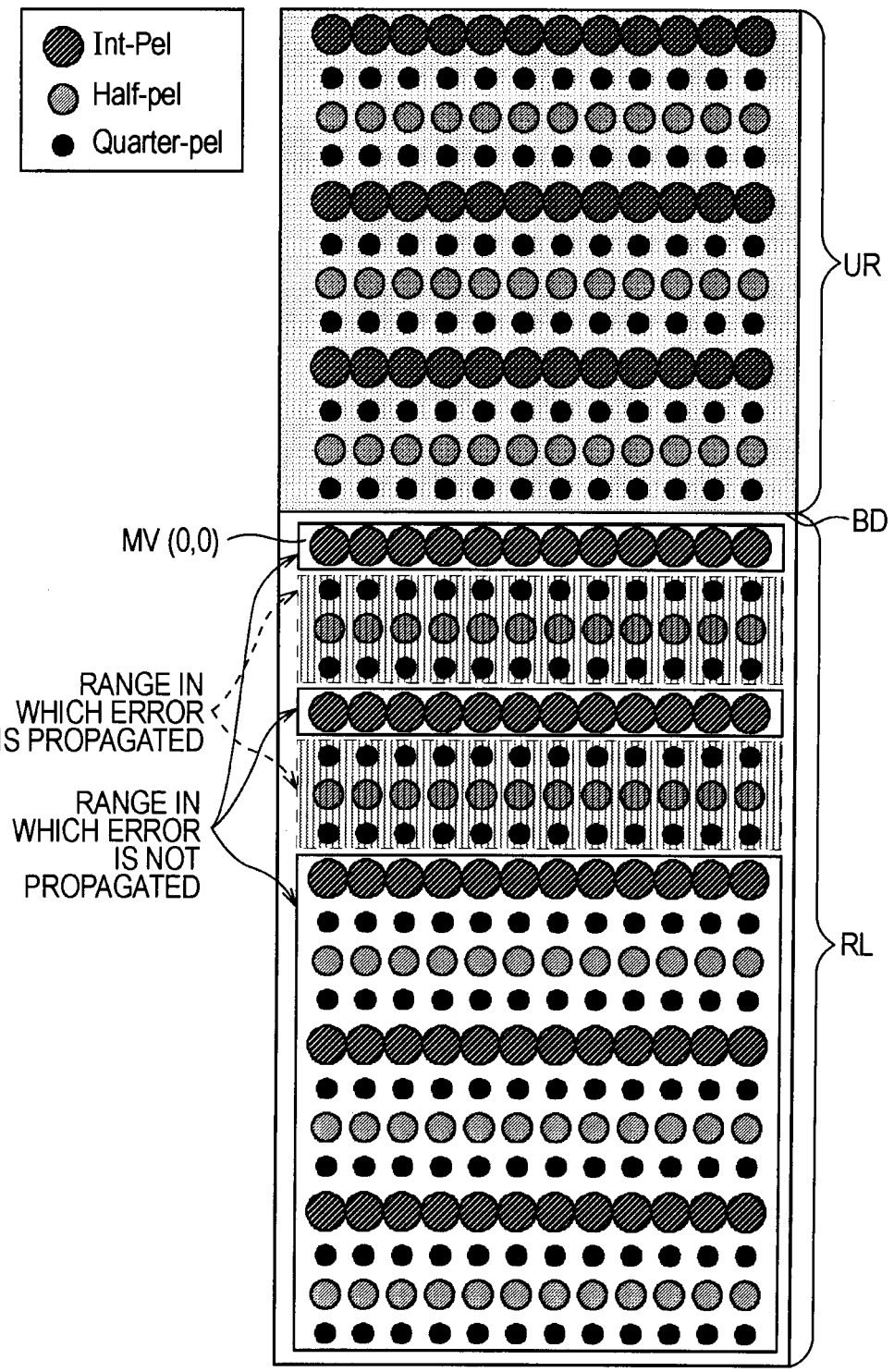
FIG. 6 is a diagram for explaining propagation of an error in a motion prediction in AVC.

As shown in FIG. 6, the half pixel and the quarter pixel (indicated by vertical lines) located outside by three pixels from the boundary (hereinafter, referred to as a refresh boundary BD) between the refresh line RL and the unrecovered line UR refer to the unrecovered line UR. The refresh boundary BD indicates a boundary (that is, the boundary between the encoding line units) which is the boundary between the refresh line RL and the unrecovered line UR. In FIG. 6, the half pixel and the quarter pixel are generated only in a y direction between the pixels. However, in effect, the half pixel and the quarter pixel are generated also in the x direction.

As a consequence, even inside the refresh line RL, an error may propagate to the half pixel and the quarter pixel located outside by three pixels from the refresh boundary BD. Hereinafter, such a pixel in which an error propagates in the refresh line RL is referenced to as an error propagation pixel (that is, a pixel that constitutes an error). Therefore, when the search range of the motion vector is set in the encoding line unit upon the encoding, there is a possibility that the error propagation pixel may be referenced upon decoding. Therefore, an error is propagated in the recovered line AR. This is the first error propagation cause.

In H.264/AVC, in-picture prediction encoding is used in the intra encoding. The second error propagation cause occurs in the in-picture prediction encoding.

As shown in FIGS. 7A to 7I, the in-picture prediction encoding is performed with reference to pixels adjacent to the encoding target I macro block and on the upper side, the left side, or both of the upper and left sides of the I macro block. When the upper side or left side of the I macro block is located in the refresh boundary BD, the unrecovered line UR is referenced and an error may thus be propagated. This is the second error propagation cause.

In H.264/AVC, a deblocking filter is used to suppress a block noise. The third error propagation cause occurs in the deblocking filter.

Figure 8:
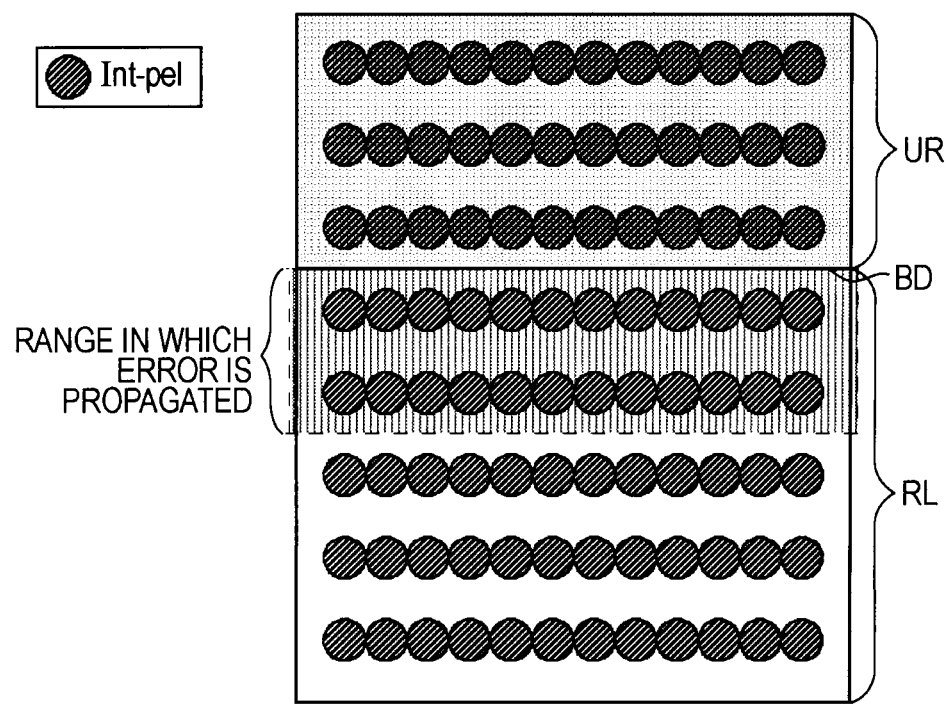
FIG. 8 is a diagram for explaining the propagation of an error in a deblocking filter of AVC.

The deblocking filter executes the deblocking filter process with reference to each two adjacent pixels (four pixels). Therefore, as shown in FIG. 8, an error may be propagated in each two pixels of the refresh line RL from the refresh boundary BD. This is the third error propagation cause.

According to the exemplary embodiment, by avoiding the first to third error propagation causes, it is possible to prevent propagation of the errors.

1-4. Avoiding Propagation of Errors 1-4-1. Avoiding First Error Propagation Cause When the image encoding unit 4 sets the search range of the motion vector in the encoding line unit, as described with reference to FIG. 6, the propagation of the error occurs. Therefore, the image encoding unit 4 sets the search range so that the propagation of the error does not occur.

When the encoding line unit is one macro block line, a search block of 16×16 pixels is displaced in the y direction in the quarter pixels, the unrecovered line UR is referenced due to the fact that the search range overflows from the refresh line RL. In this case, a search range setting section 16 sets the search range of the motion vector only in the x direction.

Specifically, the search range setting section 16 confirms the number of macro block lines in the encoding unit line from the picture head. When the encoding line unit is one macro block line, the search range setting section 16 sets a motion vector MVy in the y direction to 0 and sets the search range in the x direction to an unrestricted value (the maximum value allowable in the size in the x direction). The search range setting section 16 supplies a reference target block (that is, a reference block including a plurality of pixels of a previously-encoded image), corresponding to the search range, to the motion prediction compensation section 14. The motion prediction compensation section 14 detects the motion vector at an integer precision within the search range (that is, at a granularity of an entire pixel) and supplies the detected motion vector to the search range setting section 16.

Figure 9:
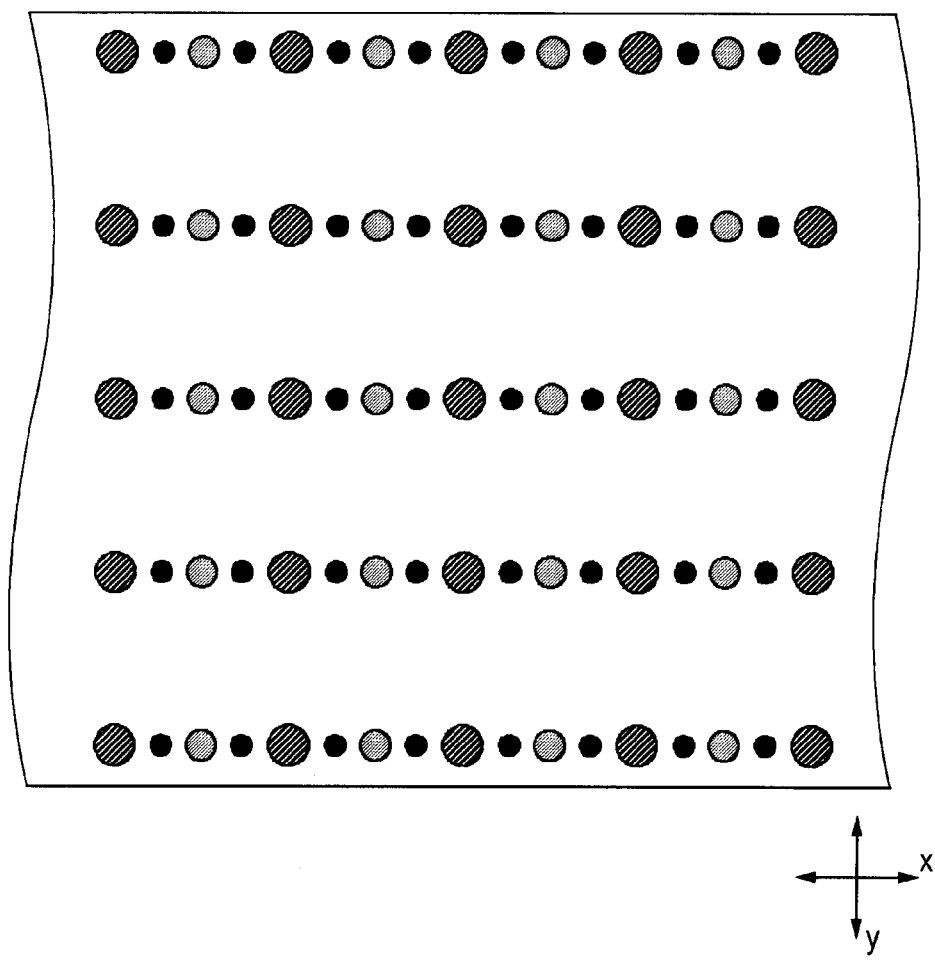
FIG. 9 is a diagram for explaining a reference target block when MVy=0.

Subsequently, the search range setting section 16 generates the half pixels and the quarter pixels only in the x direction for peripheral pixels of the motion vector detected at integer precision by using the FIR filter of 6 TAP, as shown in FIG. 9. The search range setting section 16 supplies the generated half pixels and the quarter pixels to the motion prediction compensation section 14. The motion prediction compensation section 14 detects the motion vector in the x direction at a precision greater than integer precision, for example, at quarter-pixel precision (that is, at a granularity of one-quarter pixel).

Therefore, since the image encoding unit 4 does not include the half pixels and the quarter pixels in the y direction in the search range, the half pixels and the quarter pixels are not included in two pixels adjacent to the refresh boundary BD (that is, the boundary of the reference block). As a consequence, since the image encoding unit 4 does not refer to the error propagation pixel upon decoding, it is possible to prevent propagation of the error in the recovered line AR. Therefore, it is possible to avoid the first error propagation cause.

The search range setting section 16 sets the search range of the motion vector so as not to refer to the error propagation pixel upon decoding, when the encoding line unit is two or more macro block lines.

Here, the image encoding unit 4 moves the refresh line RL between pictures downwardly to recover the error. Therefore, a portion in which the error propagation pixel occurs is a downward portion of the refresh line RL adjacent to the unrecovered line UR. The image encoding unit 4 sets the search range in the downward portion of the refresh line RL so as not to refer to the error propagation pixel.

Specifically, the search range setting section 16 sets the search range to the range of the encoding unit line and supplies an image corresponding to the search range to the motion prediction compensation section 14. The motion prediction compensation section 14 detects the motion vector at integer precision within the search range and supplies the motion vector to the search range setting section 16.

Figure 10:
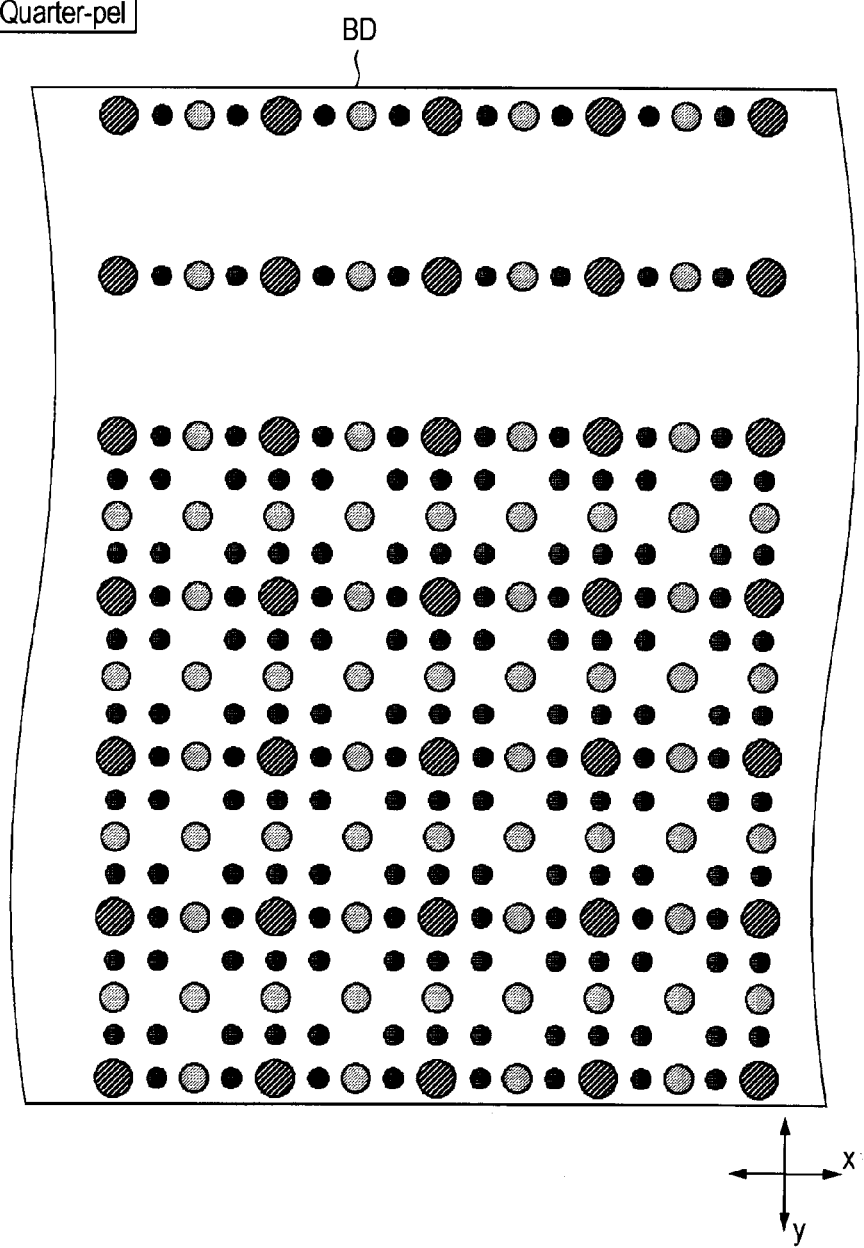
FIG. 10 is a diagram for explaining a reference target block when MVy≠0.

The search range setting section 16 generates the half pixels and the quarter pixels for the peripheral pixels of the motion vector detected at integer precision by using the FIR filter of 6 TAP, for example, as shown in FIG. 10. At this time, the search range setting section 16 generates the reference target block in the region located outside by three pixels from the refresh boundary BD (that is, a portion of the reference block displaced from the refresh boundary BD by three pixels), so as not to generate the half pixels and the quarter pixels in the y direction. The search range setting section 16 supplies the generated reference target block to the motion prediction compensation section 14.

In principle, the motion prediction compensation section 14 detects the motion vector in the x and y directions at quarter-pixel precision. The motion prediction compensation section 14 detects the motion vector at integer precision, since the half pixels and the quarter pixels in the y direction do not exist in the region located outside (that is, displaced) by three pixels from the refresh boundary BD.

In this way, since the image encoding unit 4 does not permit referring to the half pixels and the quarter pixels in the region located outside by three pixels from the refresh boundary BD upon decoding, it is possible to prevent propagation of the error caused by the reference of the error propagation pixel.

In this way, the image encoding unit 4 does not refer to the pixels (the half pixels and the quarter pixels in the portion of the reference block displaced by three pixels from the refresh boundary BD) corresponding to the error propagation pixels, when detecting the motion vector. Therefore, the decoding unit 32 can decode the recovered line AR without referring to the error propagation pixel, when decoding the recovered line AR encoded by the inter encoding. Accordingly, since the propagation of the error can be prevented, it is possible to avoid the first error propagation cause.

1-4-2. Avoiding Second Error Propagation Cause

When the image encoding unit 4 does not permit referring to the pixels other than the refresh line RL in the in-picture prediction encoding of the refresh line RL, it is possible to prevent propagation of the error caused from the unrecovered line UR.

In H.264/AVC, the pixel extending over a slice is not referenced when the in-picture prediction encoding. In other words, the refresh line RL (that is, a refresh block associated with a previously-encoded image) is configured as the head of the slice, the in-picture encoding process is executed without referring to the unrecovered line UR. In this way, when the decoding unit 32 decodes the refresh line RL, the decoding unit 32 does not refer to unrecovered line UR. Accordingly, it is possible to prevent propagation of the error.

Specifically, the picture header generating section 9 (see FIG. 3) sets an indicator, such as a flag, which indicates whether the head of the refresh line RL is configured as the head of the slice for the picture header, as "true". The intra macro block determining section 10 determines whether a processing target macro block is the I macro block to be intra-encoded or the P macro block to be inter-encoded.

The intra macro block determining section 10 sets the macro block corresponding to the refresh line RL displaced by one line as a compulsory intra macro to be compulsorily intra-encoded and determines the intra encoding. Hereinafter, a macro block belonging to the refresh line RL is referenced to as a refresh macro block. Lines organizing a macro block except for the refresh line RL are referenced to as inter macro block lines. A macro block belonging to the inter macro block line is referenced to as another macro block.

On the other hand, the intra macro block determining section 10 determines whether the macro block (that is, the macro block belonging to the intra macro block line) except for the refresh line RL is intra-encoded as the I macro block or is forward-encoded as the P macro block.

The intra macro block determining section 10 predicts the generation code amounts of the I macro block and the P macro block and determines the encoding method with good efficiency. The determination result is supplied to the slice division determining section 11.

The slice division determining section 11 determines that slice division has to be executed first, when the flag indicating the head of the refresh line RL as the head of the slice is "true" and the present macro block is the compulsory intra macro block and the head of the refresh line RL.

The slice division determining section 11 determines whether the slice division has to be executed in accordance with the position of the processing target macro block, when the picture is determined to be divided into a plurality of slices. The determination result is supplied to the slice header generating section 12.

The slice header generating section 12 generates a new slice (that is, a sub-block of the target block) by generating the slice header and adding the slice header to the head of the present macro block. The intra prediction section 15 executes the intra encoding without referring to the inter macro block line by referring to a middle pixel value ("128" when a pixel value is in the range from "0 to 155"), for example, for the macro block of the head of the slice.

In this way, the image encoding unit 4 sets the head of the refresh line RL as the head of the slice (that is, the sub-block). In this way, since the decoding unit 32 does not refer to the unrecovered line UR upon decoding the refresh line RL, it is possible to prevent propagation of the error.

In this way, the image encoding unit 4 sets the refresh line RL as the head of the slice and thus does not refer to the inter macro block line for the refresh line RL. Therefore, since the decoding unit 32 does not refer to the unrecovered line UR upon decoding the refresh line RL, it is possible to prevent propagation of the error. Accordingly, it is possible to avoid the second error propagation cause.

In H264/AVC, a flag called constrained_intra_pred_flag is prepared. By setting this flag to "1", it is possible to specify the condition that the pixel inter-encoded for the intra code is not referenced. However, when the flag is set to "1", the pixel inter-encoded for the I macro block except for the compulsory intra macro block is also not referenced. Accordingly, there is a problem in that encoding efficiency deteriorates.

Specifically, the picture header generating section 9 of the image encoding unit 4 sets constrained_intra_pred_flag=1 in PPS (Picture Parameter Set) of the picture header. The fact that the flag is set to "1" means that the pixel inter-encoded for the intra code is not referenced.

When the intra prediction section 15 confirms constrained_intra_pred_flag=1, the intra prediction section 15 executes the in-picture prediction process with reference to only the intra-encoded pixel. As a consequence, since the decoding unit 32 can decode the image data S4 with reference to only the intra-encoded pixel, it is possible to prevent propagation of the error from the unrecovered line UR.

In this way, by setting constrained_intra_pred_flag=1 by the image encoding unit 4, it is possible to prevent propagation of the error from the unrecovered line UR. Accordingly, it is possible to avoid the second error propagation cause.

1-4-3. Avoiding Third Error Propagation Cause

As described above, when the deblocking filter is used, the pixels of the unrecovered line UR have influence of the refresh boundary BD on two pixels (hereinafter, referred to as boundary pixels) upon decoding the refresh line RL and thus the boundary pixels are destroyed. Accordingly, the image encoding unit 4 does not use the deblocking filter.

Specifically, the slice header generating section 12 of the image encoding unit 4 sets an indicator, called disable_deblocking_filter_idc, equal to 1. The deblocking filter 26 confirms disable_deblocking_filter_idc. When the flag is set to "1", the slice that is, the sub-block) is not subjected to the deblocking filter process.

Therefore, since the decoding unit 32 does not execute the deblocking filter process on the uncovered line UR upon decoding the refresh line RL, it is possible to prevent propagation of the error.

In this way, since the image encoding unit 4 can prevent the boundary pixels of the refresh line RL from being destroyed due to the influence of the pixels of the non-boundary line UR without using the deblocking filter, it is possible to avoid the third error propagation cause.

1-5. Processing Sequence

When the encoding process starts, the image encoding unit 4 determines whether the processing target macro block (that is, the target block) is the head of the picture in step SP1. When a positive result is obtained, the process proceeds to step SP2. Alternatively, when a negative result is obtained, the process proceeds to step SP3.

When the image encoding unit 4 adds the picture header to the head of the processing target macro block in step SP2, the process proceeds to the next step SP3. At this time, the image encoding unit 4 adds constained_intra_pred_flag.

In step SP3, the process proceeds to a sub-routine SRT11 and the image encoding unit 4 execute a macro block determining process. When the image encoding unit 4 determines whether the processing target macro black is inter-encoded or intra-encoded as the macro block determining process, the process proceeds to the next step SP4.

In step SP4, the process proceeds to a sub-routine STR12 or STR22 and the image encoding unit 4 executes a slice division determining process. When the image encoding unit 4 determines whether to execute slice division as the slice division determining process, the process proceeds to the next step SP5.

In step SP5, the image encoding unit 4 determines whether the processing target macro block is the I macro block (the compulsory intra macro block and the intra macro block) to be intra-encoded.

When a positive result is obtained, the process proceeds to step SP6 and the image encoding unit 4 executes the in-picture prediction process. In step SP6, the image encoding unit 4 executes the in-picture prediction process on the refresh macro block so as not to refer to the inter-encoded P macro block. When the differential data D1 is generated, the process proceeds to the next step SP9.

Alternatively, when a negative result is obtained in step SP5, the process proceeds to the next step SP7 in order for the image encoding unit 4 to execute a motion prediction process.

In step SP7, the process proceeds to a sub-routine SRT13 or SRT23 and the image encoding unit 4 executes a search range determining process. The image encoding unit 4 sets the search range in the lower side of the refresh line RL as the search range determining process so as not to refer to the error propagation pixels (the half pixels and the quarter pixels of the refresh line RL located outside by three pixels from the refresh boundary BD). Then, the process proceeds to the next step SP8.

In step SP8, the image encoding unit 4 detects the motion vector in the search range set in step SP7, executes the motion prediction process, and generates the differential data D1. Then, the process proceeds to step SP9.

In step SP9, the image encoding unit 4 executes an orthogonal transform process and a quantization process on the differential data D1. When the quantization coefficient D3 is generated, the process proceeds to the next steps SP10 and SP11 to simultaneously execute the processes of steps SP10 and SP11. In step SP10, the image encoding unit 4 executes a reversible encoding process on the quantization coefficient D3. When the reversible encoding data D5 is generated, the reversible encoding data D5 is supplied as the bit stream S6 to the transmitting unit 6 to end the encoding process sequence RT1.

In step SP11, the image encoding unit 4 executes an inverse quantization process and an inverse orthogonal transform process. When the local decode image L3 (that is, the predicted image data for the processing target macro block) is generated, the process proceeds to the next step SP12.

In step SP12, the image encoding unit 4 confirms a value of disable_deblocking_filter_idc, and determines whether to execute the deblocking filter process.

When a positive result is obtained, the process proceeds to step SP13 and the image encoding unit 4 executes the deblocking filter process. Then the process proceeds to an end step to end the encoding process sequence RT1.

Alternatively, when a negative result is obtained in step SP12, the process proceeds to the end step and the image encoding unit 4 ends the encoding process sequence RT1.

Figure 12:
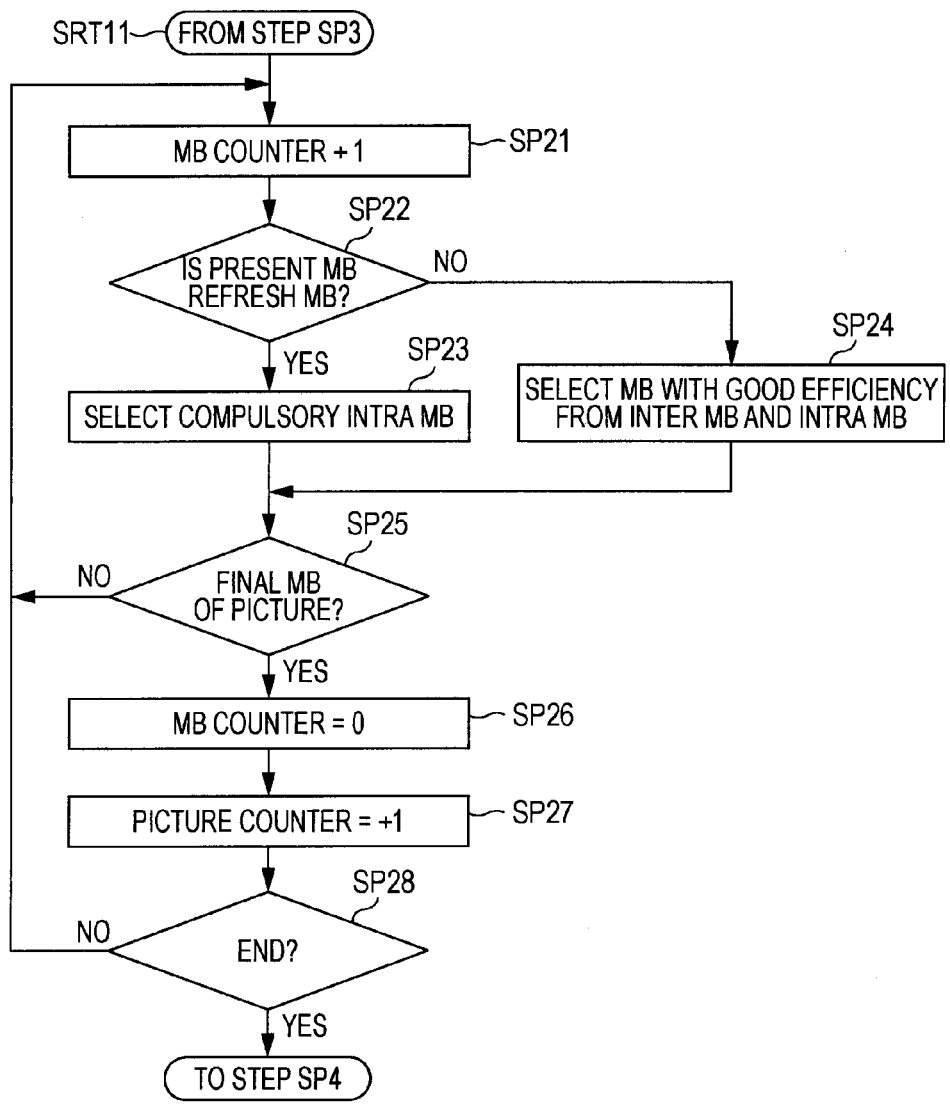
FIG. 12 is a flowchart illustrating the sequence of a macro block determining process.

The image encoding unit 4 permits the process from step SP3 of the encoding process sequence RT1 to step SP21 of the sub-routine SRT11 (see FIG. 12).

In step SP21, when the processing target macro block is supplied, the image encoding unit 4 adds "+1" to an MB counter counting the number of macro blocks in each picture and a SMB counter counting the number of macro blocks in each slice. Then, the process proceeds to the next step SP22. In step SP22, the image encoding unit 4 determines whether the present processing target macro block is the refresh macro block.

When a positive result is obtained, the processing target macro block belongs to the refresh line RL. At this time, the process proceeds to step SP23 and the image encoding unit 4 selects the intra-encoding of the processing target macro block as the compulsory intra macro block. Then, the process proceeds to the next step SP25.

Alternatively, when a negative result is obtained in step S22, the processing target macro block belongs to the inter macro block line. At this time, the image processing unit 4 permits the process to proceed to the next step SP24.

In step SP24, the image encoding unit 4 predicts the generation code amount of the processing target macro block generated by the inter-encoding and the intra encoding. When the image encoding unit 4 selects an encoding method, in which the encoding efficiency is good, as the encoding method of encoding the processing target macro block in effect, the process proceeds to the next step SP25.

In step SP25, the image encoding unit 4 determines whether the processing target macro block is the final macro block in the picture. When a negative result is obtained, the process returns to step SP21 and the image encoding unit 4 continues the processes from step SP21 to SP25 until the process on all of the macro blocks ends.

Alternatively, when a positive result is obtained in step SP25, the image encoding unit 4 permits the process to proceed to the next step SP26. The image encoding unit 4 resets the MB counter to "0" in step SP26, and the process proceeds to the next step SP27.

In step SP27, the image encoding unit 4 adds "+1" to the picture counter counting the number of the pictures. Then, the process proceeds to the next step SP28.

In step SP28, the image encoding unit 4 determines whether the process on all of the pictures ends. When a negative result is obtained, the process returns to step SP21 and the processes from step SP21 to SP28 continue until the process on all of the pictures ends.

Figure 11:
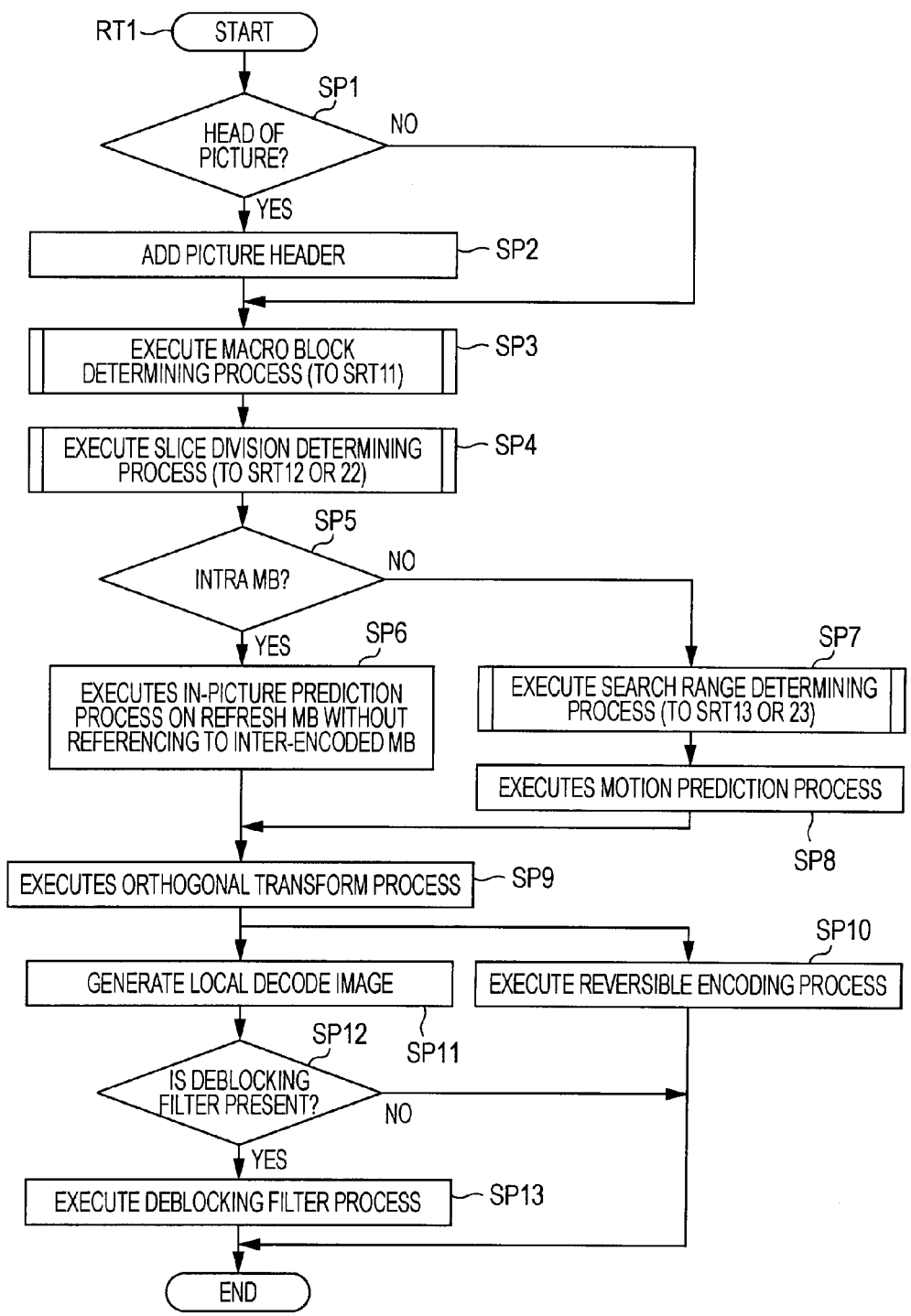
FIG. 11 is a flowchart illustrating the sequence of an encoding process.

Alternatively, when a positive result is obtained in step SP28, the image encoding unit 4 permits the process to proceed to step SP4 of the encoding process sequence RT1 (see FIG. 11).

Figure 13:
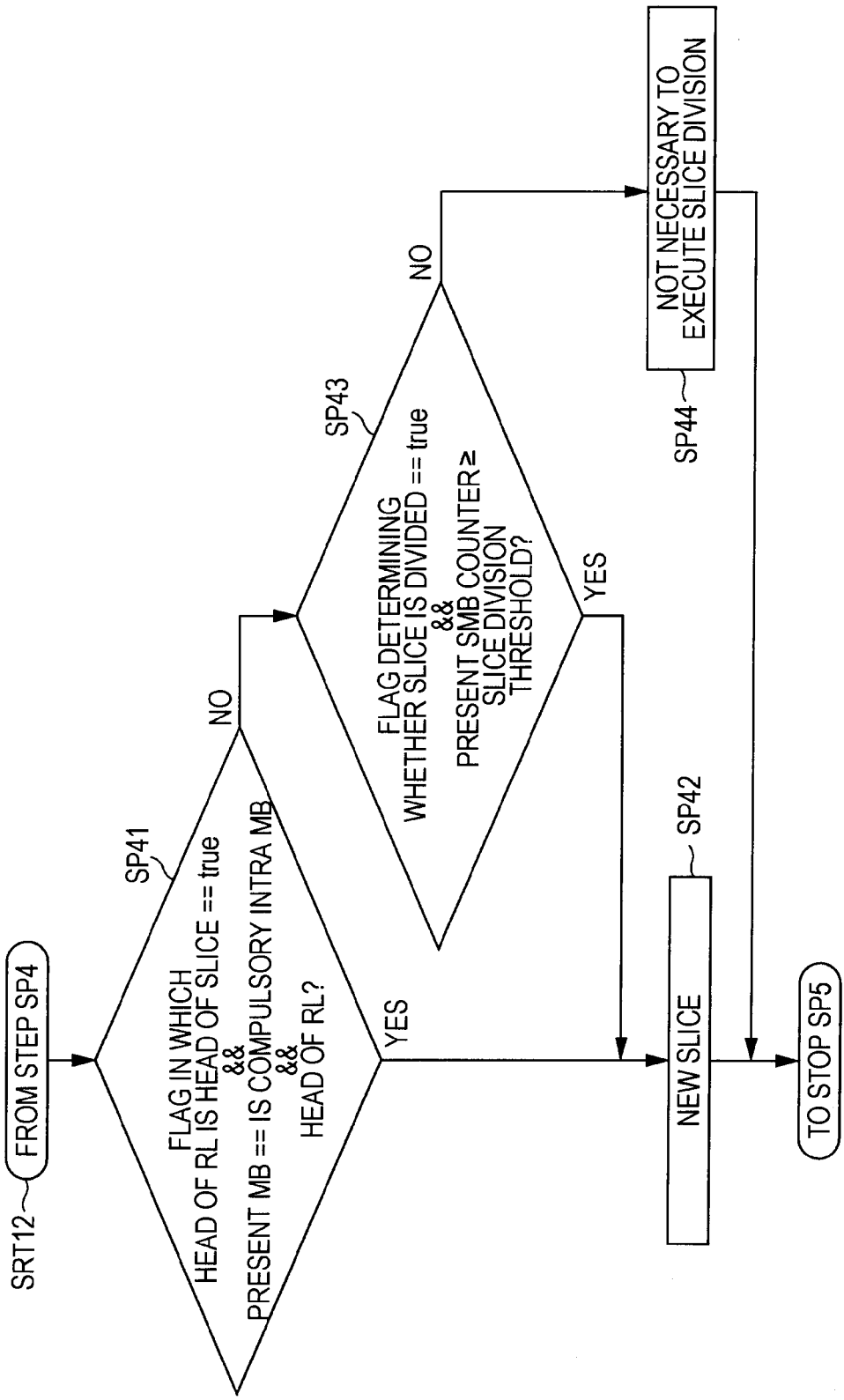
FIG. 13 is a flowchart illustrating the sequence of a slice division determining process according to a first exemplary embodiment.

In step SP4 of the encoding process sequence RT1, the image encoding unit 4 permits the process to proceed to step SP41 of the sub-routine SRT12 (see FIG. 13) of the slice division determining process.

In step SP41, the image encoding unit 4 determines whether the processing target macro block satisfies all the following three conditions:
1) the flag in which the head of the refresh line RL is the head of the slice is "true";
2) the processing target macro block is the compulsory intra macro block; and
3) the processing target macro block is the head of the refresh line RL.

When a positive result is obtained in step SP41, the head of the refresh line RL is the head of the slice and the present macro block is the head of the refresh line RL. Then, the image encoding unit 4 permits the process to proceed to the next step SP42.

Alternatively, when a negative result is obtained in step SP41, the head of the refresh line RL is not the head of the slice and the processing target macro block is not the head of the refresh line RL. Then, the image encoding unit 4 permits the process to proceed to the next step SP43.

In step SP43, the image encoding unit 4 determines whether the processing target macro block satisfies all the following two conditions:
1) the flag determining whether the slice is divided is "true"; and
2) the SMB counter counting the number of macro blocks in each slice is a slice division threshold value.

When a positive result is obtained, this result means that the picture is divided into the slices from the value (that is, the position of the processing target macro block) of the present MB counter since the picture is determined in advance to be divided into the plurality of slices. Then, the image encoding unit 4 permits the process to proceed to the next step SP42.

In step SP42, the image encoding unit 4 executes the slice division so that a new slice (that is, a sub-block) is formed from the processing target macro block and also resets the SMB counter. At this time, the image encoding unit 4 sets disable_deblocking_filter_idc. Then, the image encoding unit 4 permits the process to proceed to step SP5 of the encoding process sequence RT1 (see FIG. 11).

Alternatively, when a negative result is obtained in step SP43, this result means that it is not necessary for the picture to be divided into a plurality of slices or the picture has not to be divided into the slices from the value (that is, the position of the processing target macro block) of the present SMB counter. Then, the image encoding unit 4 permits the process to proceed to the next step SP44.

In step SP44, the image encoding unit 4 does not execute the slice division and the process proceeds to step SP5 of the encoding process sequence RT1 (see FIG. 11).

Figure 14:
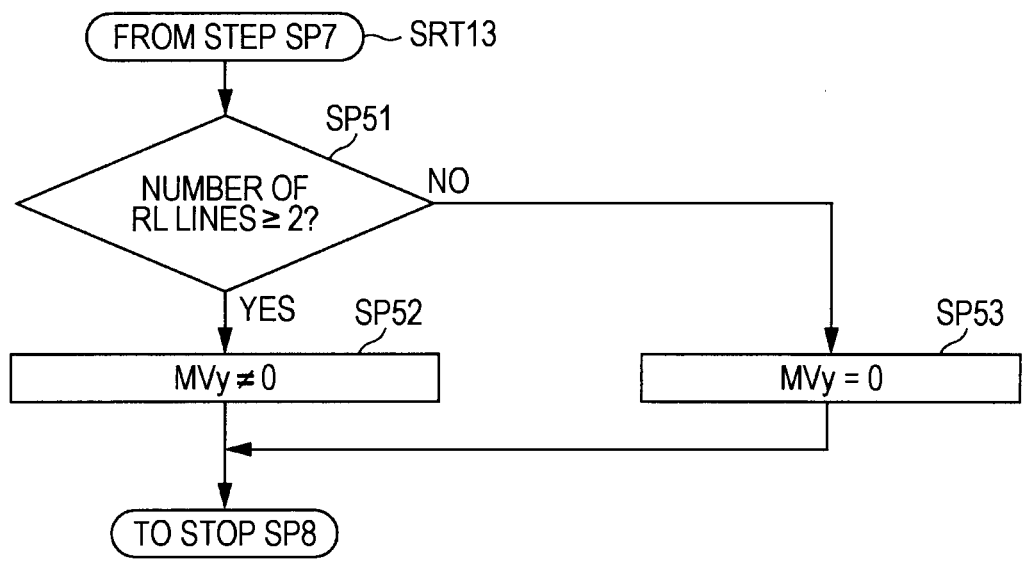
FIG. 14 is a flowchart illustrating the sequence of a search range determining process according to the first exemplary embodiment.

In step SP7 of the encoding process sequence RT1 (see FIG. 11), the process proceeds to step SP51 of the sub-routine SRT13 (see FIG. 14) and the image encoding unit 4 determines whether the number of macro blocks of the refresh line RL is two or more.

When a positive result is obtained, the image encoding unit 4 permits the process to proceed to the next step SP52. In step SP52, the image encoding unit 4 sets the encoding line unit except for the half pixels and the quarter pixels located outside by three pixels from the refresh boundary BD for the left of the refresh line RL so as not to refer to the error propagation pixel upon decoding, as the search range of a motion vector MVy in the y direction. Then, the process returns to step SP8 of the encoding process sequence RT1 (see FIG. 11).

Alternatively, when a negative result is obtained in step SP51, the process proceeds to the next step SP53. In step SP53, the image encoding unit 4 sets the search range of the motion vector MVy in the y direction so as not to refer to the error propagation pixel upon decoding to "0" (that is, the motion vector MVy="0"). Then, the process returns to step SP8 of the encoding process sequence RT1 (see FIG. 11).

1-6. Operation and Advantage

The image encoding unit 4 of the image processing apparatus 1 executes the intra encoding on the compulsory intra macro block. The image encoding unit 4 generates the half pixels and the quarter pixels at a precision smaller than integer precision by a filter process of using the adjacent pixels, in the reference encoding unit (that is, the reference target block) in the reference picture which is a reference target.

The image encoding unit 4 sets the search range of the reference block upon the motion prediction process, which is executed with reference to the half pixels and the quarter pixels of the reference target block, at the precision smaller than integer precision. The image encoding unit 4 sets, as the search range, the range with no pixels (that is, the half pixels and the quarter pixels existing outside three pixels from the refresh boundary BD) of the half pixels and the quarter pixels corresponding to the number of the adjacent pixels from the refresh boundary BD which is the boundary between the compulsory intra macro block and another macro block. The image encoding unit 4 detects the motion vector in the set search range and executes the motion prediction process.

In this way, the image encoding unit 4 can encode the processing target macro block without referring to the error propagation pixel in which an error is likely to be propagated upon decoding. Therefore, even when an error occurs in the decoding unit 32, the decoding can be executed without referring to the error propagation pixel. Accordingly, it is possible to prevent propagation of an error occurring when the motion vector is detected.

The image encoding unit 4 encodes the image data S4 organized by the plurality of pictures by the intra encoding and the forward inter encoding. At this time, the image encoding unit 4 allocates the macro block to the compulsory intra macro block or another macro block, which is a macro block other than the compulsory intra macro block, so that the macro block which is the encoding unit in the picture at a certain period becomes the compulsory intra block to be intra-encoded. In this way, the image encoding unit 4 can permit the compulsory macro block to emerge at the certain period.

The image encoding unit 4 imposes restrictions on the deblocking filter process by setting disable_deblocking_filter_idc as filter setting information. The image encoding unit 4 executes the deblocking filter process on the local decode image L3 of the macro block encoded by the motion prediction compensation section 14 and the motion prediction compensation section 14 as the motion section in accordance with the set disable_deblocking_filter_idc.

In this way, since the image encoding unit 4 can impose restrictions on the deblocking filter process which is a cause of error propagation, it is possible to prevent propagation of the error upon decoding.

The image encoding unit 4 executes the encoding to prevent propagation of the error upon decoding. Therefore, even when the error occurs upon decoding, the decoding unit 32 can prevent propagation of the error. Accordingly, it is possible to shorten the time necessary for the recovery from the error.

The image encoding unit 4 imposes restrictions on the reference target for the compulsory intra macro block so as not to refer to the macro block formed by the inter block to be inter-encoded, and executes the in-picture prediction process in accordance with the restrictions.

Even when the upper portion of the refresh boundary BD is not recovered, the image encoding unit 4 does not refer to the inter block. Therefore, the error is not propagated to the refresh line RL. Accordingly, when an error occurs in wireless transmission, the image encoding unit 4 can shorten the time necessary for the recovery from the error.

The image encoding unit 4 sets a vertical search range to "0", when the refresh line RL is organized by single macro blocks arranged horizontally (that is, one macro block line).

Therefore, the image encoding unit 4 does not refer to the half pixels and the quarter pixels located outside (that is, displaced) by three pixels from the refresh boundary RL. Accordingly, since the decoding unit 32 does not refer to the error propagation pixel, it is possible to prevent propagation to the inter macro block.

The image encoding unit 4 allocates the compulsory intra macro blocks so that the refresh line RL organized by the compulsory intra macro blocks are displaced by the same number as the number of vertical (y direction) macro blocks of the refresh line RL in the downward direction of the y direction which is a displacement direction. Then, the image encoding unit 4 sets disable_deblocking_filter_idc to "1".

In this way, since the image encoding unit 4 can move the refresh line RL between the pictures in succession, the lower portion of the recovered line AR can be typically made adjacent to the refresh line RL or the recovered line AR. Accordingly, the decoding unit 32 does not generate the error propagation pixel in the lower portion of the recovered line AR formed by the inter blocks.

As a consequence, since the image encoding unit 4 can set the search range of the motion vector in the downward direction of the y direction up to the refresh boundary BD, the search range can be expanded.

The image encoding unit 4 sets the flag indicating that the head of the compulsory intra macro block is the head of the slice to "true" and divides the slice immediately before the head of the compulsory intra macro block (that is, the head of the refresh line).

The image encoding unit 4 does not refer to the inter encoding line above one macro block of the refresh line RL. Therefore, when the decoding unit 32 decodes the refresh line RL, the unrecovered line UR is not referenced. Accordingly, it is possible to reliably recover the refresh line RL.

The image encoding unit 4 sets constrained_intra_pred_flag to "1". The image encoding unit 4 executes the in-picture prediction process on the compulsory intra macro block without referring to the inter macro block in accordance with constrained_intra_pred_flag.

In this way, the image encoding unit 4 can execute the in-picture prediction process without referring to the inter macro block. Therefore, since the decoding unit 32 does not refer to the unrecovered line UR in the in-picture prediction process, it is possible to reliably recover the refresh line RL.

The image encoding unit 4 allocates the macro blocks to be allocated to another macro block to the inter refresh block to be inter-encoded and the intra refresh block to be intra-encoded. By setting the flag indicating that the head of the compulsory intra macro block is the head of the slice to "true", the reference block is restricted.

In this way, the image encoding unit 4 can refer to the inter block upon intra-encoding the block other than the compulsory macro block. On the other hand, when constrained_intra_pred_flag is set to "1" the P macro block is not referenced for all of the I macro blocks (the compulsory intra macro blocks and the intra macro blocks).

Therefore, the image encoding unit 4 can improve the encoding efficiency, compared to the case where constrained_intra_pred_flag is used.

The image encoding unit 4 execute the process in conformity with H.264/AVC.

By applying the exemplary embodiment to H.264/AVC in which the motion vector is detected at quarter-pixel precision and the deblocking filter is used, it is possible to appropriately prevent propagation of the error. Accordingly, it is possible to shorten the time necessary for the recovery from the error.

With such a configuration, the image encoding unit 4 sets the search range of the reference block so as not to include the pixels generated with reference to the macro block, which is not recovered from the error upon decoding, at the precision greater than integer precision (that is, at a granularity less than an entire pixel). The image encoding unit 4 imposes restrictions on the deblocking filter process so as not to refer to an unrecovered macro block which is not recovered from the error upon decoding.

In this way, since the image encoding unit 4 can appropriately prevent propagation of the error upon decoding, it is possible to shorten the time necessary for the recovery from the error.

2. Second Exemplary Embodiment

In a second exemplary embodiment described with reference to FIGS. 15A to 22, the same reference numerals are given to the same portions as those of the first exemplary embodiment described with reference to FIGS. 2 to 14, and the same description is omitted. The second exemplary embodiment is different from the first exemplary embodiment in that the deblocking filter 26 of an image encoding unit 104 corresponding to the image encoding unit 4 executes the deblocking filter process.

2-1. Avoiding Third Error Propagation Cause 2-1-1. Repeated Emergence of Refresh Line When the deblocking filter process is executed, as described with reference to FIG. 8, the boundary pixels formed by two pixels from the refresh boundary BD are destroyed due to the influence of the unrecovered line UR. In this exemplary embodiment, disable_deblocking_filter_idc=2 is set. The fact that the flag is set to "2" means that the deblocking filter process is not executed on the slice boundary. That is, since the image encoding unit 104 can execute the deblocking filter process in a portion except for the slice boundary by setting flag to "2", it is possible to reduce a deblocking noise.

The image encoding unit 4 may not have an influence between the encoding line units by dividing all of the encoding line units into the slices. However, in terms of the encoding efficiency, it is not proper to divide all of the encoding line units into the slices.

Figure 15A:
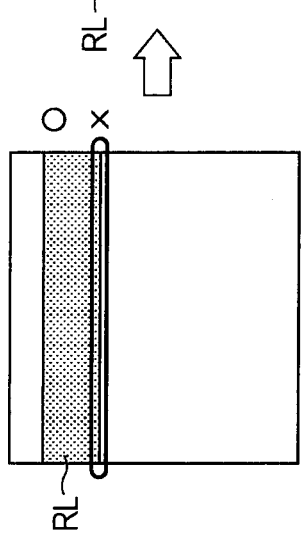
FIGS. 15A to 15C are diagrams for explaining the intra slice method according to a second exemplary embodiment.

As shown in FIG. 15A, the image encoding unit 104 according to the second exemplary embodiment organizes the refresh line RL to a plurality of macro block lines and also divides the head of the refresh line RL into the slices (that is, sub-blocks). In this case, the macro block lines (hereinafter, referred to as a boundary MB line RLb) of the refresh boundary BD located in the lowermost portion of the refresh line RL is influenced by the unrecovered line UR by the deblocking filter process.

Figure 15B:
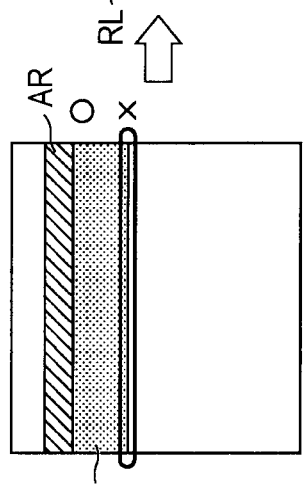
Figure 15C:
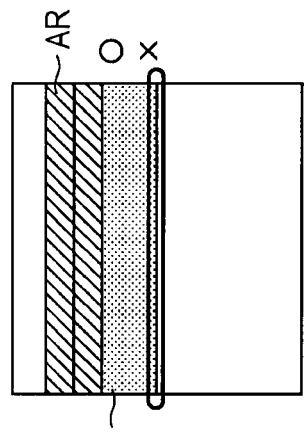

However, the macro block line except for the boundary MB line RLb is not influenced by the unrecovered line UR, but may be normally recovered. In FIGS. 15A to 15C, the pixels destroyed due to the influence of the unrecovered line UR is indicated by a line.

As shown in FIGS. 15B and 15C, the image encoding unit 104 moves the refresh line RL while overlapping the position of the refresh line RL with at least one macro block line so that the boundary MB line RLb in the previous picture becomes the refresh line RL in the next picture again. Therefore, the image encoding unit 104 breaks the boundary MB line RLb in the deblocking filter process on the previous picture, but can recover the boundary MB line RLb for the next picture.

Specifically, the intra macro block determining section 10 of the image encoding unit 104 determines the macro block corresponding to the refresh line RL as the compulsory intra macro block, when the encoding line unit is two macro block lines. The intra macro block determining section 10 determines the processing target macro block as the I macro block or the P macro block in terms of the encoding efficiency, when the processing target macro block is not the compulsory intra macro block.

The intra macro block determining section 10 determines the compulsory intra macro block for the previous picture so that the boundary MB line RLb in the previous picture becomes the refresh line RL in the next picture again. That is, the intra macro block determining section 10 permits the refresh line RL to emerge so as to be delayed by one macro block line.

As a consequence, the decoding unit 32 destroys the pixels below the boundary MB line RLb among the refresh lines RL by the deblocking filter process, but can recover the boundary MB line RLb for the next picture.

In this way, the image encoding unit 104 permits the boundary MB line RLb, which is the boundary below the unrecovered line UR, among the refresh lines RL to emerge as the refresh line RL for the next picture again. Therefore, the decoding unit 32 can appropriately recover the pixels destroyed by the deblocking filter process in the next picture.

2-1-2. Division of Slice

In the first exemplary embodiment, the image encoding unit 4 sets the head of the refresh line RL as the head of the slice. That is, in the first exemplary embodiment, the slice boundary BL is displaced with the displacement of the position of the refresh line RL. Hereinafter, the slice boundary displaced in this way is referenced to as a slice boundary BLmove.

A case where the deblocking filter process is executed on the boundaries except for the slice boundary BLmove will be mainly described. As shown in FIGS. 16A to 16C, a success whether decoding is recovered from the error without consideration of the influence of the deblocking filter is indicated by O or X on the left side, and a success whether the error is recovered in consideration of the influence of the deblocking filter process is indicated by O or X on the right side.

As shown in FIG. 16A, the refresh line RL has no problem in the in-picture prediction process and thus is decoded. In the boundary MB line RLb, however, the adjacent pixels are destroyed in the deblocking filter process.

As shown in FIG. 16B, a recovered line AR1 has no problem and thus is decoded, since the range in which the error is not propagated in the boundary MB line RLb and the refresh line RL are referenced. In the recovered line AR1, however, the adjacent pixels are destroyed, since the upper portion of the recovered line AR1 is subjected to the deblocking filter process by using the unrecovered line UR.

As shown in FIG. 16C, a recovered line AR2 has no problem and thus is decoded, since the range in which the error is not propagated in the boundary MB line RLb and the refresh line RL are referenced. In a recovered line AR3, however, the error is propagated, since the recovered line AR1 in which the adjacent pixels are destroyed is referenced. In the recovered line AR2, the error is propagated, since the deblocking filter process is executed by using the recovered line AR3 in which the error is propagated.

When the slice boundary BLmove is displaced, the error is propagated due to the influence of the deblocking filter process in the recovered line AR to be inter-encoded. Therefore, it is difficult to recover the error.

The image encoding unit 104 according to the second exemplary embodiment fixes the slice boundary as a slice boundary BLfix.

As shown in FIG. 17A, the refresh line RL has no problem due to the in-picture prediction process and thus is recovered. In the boundary MB line RLb, however, the boundary pixels are destroyed in the deblocking filter process.

As shown in FIG. 17B, the head of the slice becomes the recovered line AR1, since the slice boundary BLfix is not displaced. The recovered line AR1 has no problem and thus is recovered, since the range in which the error is not propagated in the boundary MB line RLb and the refresh line RL are referenced. Since the recovered line AR1 is located on the slice boundary BLfix, the deblocking filter process is not executed in the boundary between the recovered line AR1 and the unrecovered line UR. For this reason, the recovered line AR1 can be recovered without destruction of the boundary pixels.

As shown in FIG. 17C, the recovered lines AR2 and AR3 have no problem in the motion prediction process and thus are decoded. At this time, since the recovered line AR3 is the head of the slice, the deblocking filter process is not executed and thus the error is not propagated. In the recovered line AR2, the error is not propagated since the deblocking filter process is executed using the recovered line AR3 in which the error is not propagated.

In this way, by fixing the slice boundary BLfix, it is possible to prevent propagation of the error caused in the deblocking filter process. In the second exemplary embodiment, since the refresh line RL becomes the head of the slice and then the recovery from the error starts, a period of 2T-1 is necessary in the recovery from the error. Therefore, recovery according to the second exemplary embodiment takes more slightly time than that of the first exemplary embodiment.

Specifically, the picture header generating section 9 of the image encoding unit 104 sets the flag indicating whether the slice division is executed to "true", and also sets a slice division threshold value. The slice division threshold value indicates the number of macro blocks subjected to the slice division from the head of the picture and indicates the position of the slice boundary BLfix.

The slice division determining section 11 counts the number of macro blocks from the head of the picture by the MB counter, as in the first exemplary embodiment. When the slice division determining section 11 confirms the picture header to confirm whether the flag indicating the slice division is "true", the slice division determining section 11 determines whether the processing target macro block is equal to or larger than the slice division threshold value.

When the value of the present MB counter is equal to or larger than the slice division threshold value, the slice division determining section 11 determines that the slice division is executed. The determination result is supplied to the slice header generating section 12. The slice header generating section 12 executes the slice division by generating the slice header and adding the slice header to the image data S4.

In this way, by executing the slice division at the predetermined position, it is possible to prevent propagation of the error in the deblocking filter process.

2-2. Avoiding Second Error Propagation Cause

As described above, the image encoding unit 104 according to the second exemplary embodiment does not set the head of the refresh line RL as the head of the slice. As shown in FIGS. 17A to 17C, however, by fixing the slice boundary BLfix, the inter encoding line between the slice boundary BLfix and the refresh line RL is recovered.

Since the inter encoding line likely to be referenced by the refresh line RL is recovered, there is no particular problem even when the inter encoding line is the reference target block.

2-3. Avoiding First Error Propagation Cause

The pixels of the boundary MB line RLb destroyed in the deblocking filter process in the image encoding unit 104 are only the boundary two pixels disposed adjacent to the unrecovered line UR. Here, the image encoding unit 104 sets pixels of the boundary MB line RLb, which are not influenced by the unrecovered line UR, in addition to the encoding line unit of the previous picture.

Figure 18:
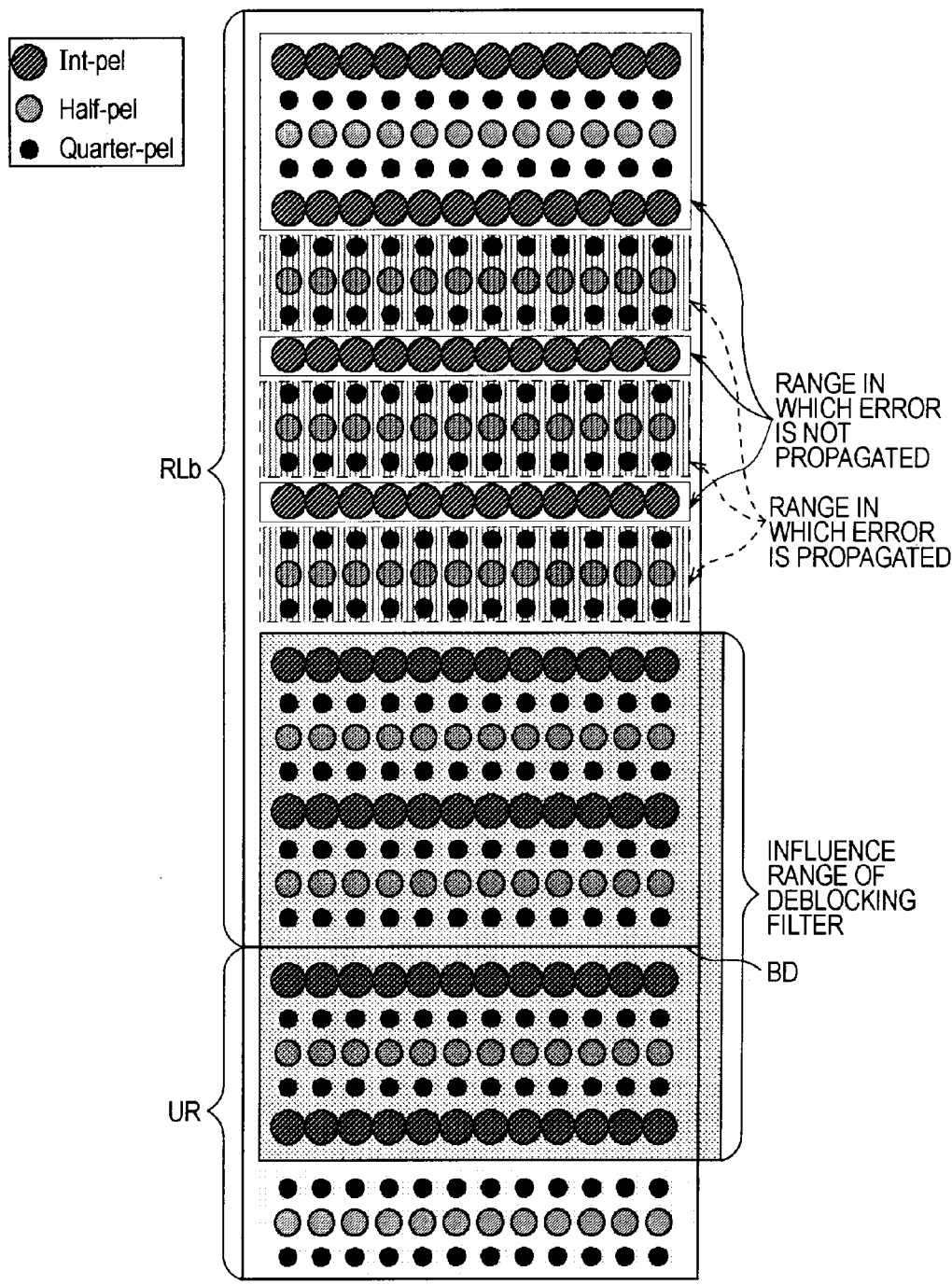
FIG. 18 is a diagram for explaining an influence of a deblocking filter.

As shown in FIG. 18, the boundary pixels are destroyed in the boundary MB line RLb due to the influence of the unrecovered line UR. For this reason, the half pixels and the quarter pixels generated with reference to the boundary pixels may become the error propagation pixels propagating the error due to the influence of the unrecovered line UR. Therefore, the image encoding unit 104 sets the boundary pixels and the range except for the error propagation pixels as the search range of the motion vector.

As shown in FIG. 19A, the search range setting section 16 of the image encoding unit 104 sets the encoding line unit (excluding the upper error propagation pixels "$\Delta_U$") corresponding to the previous picture out of the encoding line units (see FIG. 19B) of the processing target of the next picture to the search range in the y direction. Moreover, the search range setting section 16 sets a part of the encoding line unit immediately below the encoding line unit corresponding to the pervious picture to the search range of the motion vector in the y direction. The part of the encoding line unit is a range excluding the upper error propagation pixels ("$\Delta_U$"), the lower boundary pixels ("X"), and the lower error propagation pixels ("$\Delta_L$").

Specifically, when the motion vector is detected at integer precision, the search range setting section 16 sets, as the search range in the y direction, fourteen pixels excluding the upper boundary pixels (indicated by $\Delta_U$) in the encoding line unit immediately below the encoding line unit corresponding to the previous picture, in addition to the encoding line unit corresponding to the previous picture, as the search range in the y direction. The search range in the x direction is not restricted.

When the motion vector is detected at quarter-pixel precision, the search range setting section 16 sets, as a search range in the y direction, the pixels excluding the boundary pixels (indicated by X) and the error propagation pixels (indicated by $\Delta_U$ and $\Delta_L$) in the encoding propagation pixels immediately below the encoding line unit corresponding to the previous picture, in addition to the encoding line unit (excluding the error propagation pixels) corresponding to the previous picture, as the search range in the y direction.

In this way, since the image encoding unit 104 sets the large search range of the motion vector in the y direction, it is possible to improve the encoding efficiency.

In this way, the image encoding unit 104 sets the range, in which the error is not propagated, as the search range of the motion vector. Accordingly, it is possible to improve the encoding efficiency, while preventing the propagation of the error.

In the second exemplary embodiment, as described above, it is possible to prevent propagation of the error upon decoding by executing the deblocking filter process, while improving the image quality.

2-4. Processing Sequence

Figure 20:
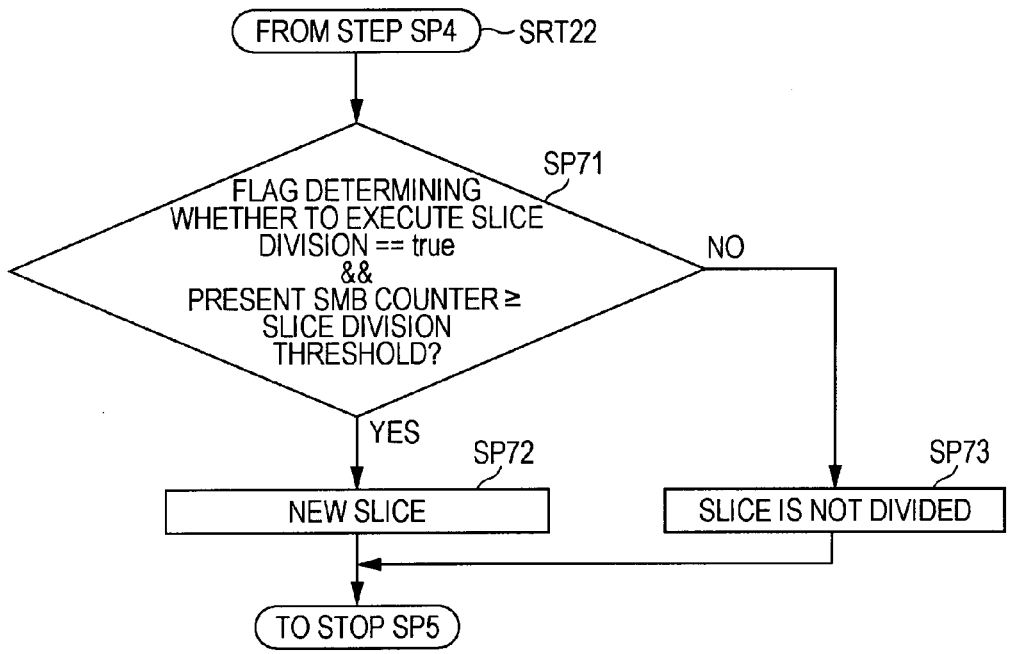
FIG. 20 is a flowchart illustrating the sequence of a slice division determining process according to the exemplary second embodiment.
Figure 21:
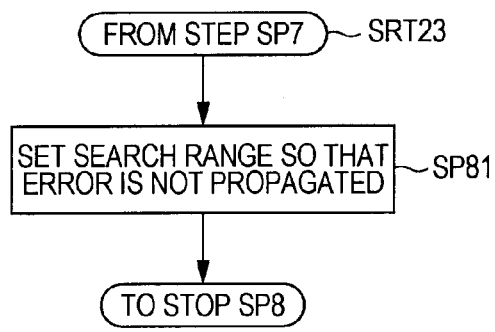
FIG. 21 is a flowchart illustrating the sequence of a search range determining process according to the second exemplary embodiment.

Next, the processing sequence according to the second exemplary embodiment will be described with reference to flowcharts of FIGS. 20 and 21. In the second exemplary embodiment, the encoding process sequence RT1 (see FIG. 11) is executed as in the first exemplary embodiment, but a sub-routine SRT22 is executed in step SP4 and a sub-routine SRT23 is executed in step SP7. Hereinafter, the sub-routines SRT22 and SRT23 will be described.

The process proceeds from step SP4 of the encoding process sequence RT1 (see FIG. 11) to step SP71 of the sub-routine SRT22 (see FIG. 20), and the image encoding unit 104 executes the slice division determining process.

In step SP71, the image encoding unit 104 determines whether the processing target macro block satisfies all the following two conditions:

1) the flag determining whether the slice is divided is "true"; and 2) the present SMB counter is equal to or larger the slice division threshold value.

When a positive result is obtained, this result means that the picture is divided into the slices from the value (that is, the position of the macro block) of the present SMB counter since the picture is determined in advance to be divided into the plurality of slices. Then, the image encoding unit 104 permits the process to proceed to the next step SP72.

In step SP72, the image encoding unit 104 executes the slice division so that a new slice (that is, a sub-block) is formed from the processing target macro block and also resets the SMB counter. At this time, the image encoding unit 104 sets disable_deblocking_filter_idc. Then, the image encoding unit 104 permits the process to proceed to step SP5 of the encoding process sequence RT1 (see FIG. 11).

Alternatively, when a negative result is obtained in step SP71, this result means that it is not necessary for the picture to be divided into the plurality of slices or the picture has not to be divided into the slices from the value (that is, the position of the macro block) of the present SMB counter. Then, the image encoding unit 104 permits the process to proceed to the next step SP73.

In step SP73, the image encoding unit 104 does not execute the slice division and the process proceeds to step SP5 of the encoding process sequence RT1 (see FIG. 11).

In step SP7 of the encoding process sequence RT1, the image encoding unit 104 permits the process to proceed to step SP81 of the sub-routine SRT23 indicating the sequence of the search range setting process.

When the image encoding unit 104 sets the range in which the error is not propagated in step SP81, the process proceeds to step SP8 of the encoding process sequence RT1 (see FIG. 11). In the second exemplary embodiment, the search range in which the error is not propagated is the maximum value allowable in the size in the x direction, the encoding line unit (excluding the upper error propagation pixels) corresponding to the previous picture in the y direction, and a part of the encoding line immediately below the encoding line unit corresponding to the previous picture. The part of the encoding line unit is a range in which the upper error propagation pixels, the lower boundary pixels, and the lower error propagation pixels are excluded.

2-5. Operation and Advantage

With such a configuration, the image encoding unit 104 allocates the compulsory intra macro block so as to be displaced by the displacement number smaller than the number of macro blocks of the refresh line RL in the y direction by at least one in the downward direction of the y direction, in which the refresh line R1 is the displacement direction, between the pictures. The image encoding unit 104 executes the slice division at the fixed position of the picture and sets disable_deblocking_filter_idc to "1". The image encoding unit 104 divides the slice at the fixed position (the slice boundary BLfix) constant between the pictures.

The decoding unit 32 executes the deblocking filter process on the lower refresh boundary BD of the refresh line RL between the pictures in the y direction with reference to the unrecovered line UR. However, since the decoding unit 32 permits the refresh line RL of the refresh boundary to emerge repeatedly in the next picture, it is possible to recover the macro block line destroyed in the deblocking filter process from the error.

The decoding unit 32 recovers only the recovered line AR between the slice boundary BLfix to the refresh line RL by fixing the slice boundary BLfix. Therefore, even when the deblocking filter process is executed, the error is not propagated. Accordingly, the image encoding unit 104 can prevent propagation of the error in the deblocking filter process.

In the in-picture prediction process, only the recovered line AR is recovered between the slice boundary BLfix to the refresh line RL. Therefore, even when the refresh line RL refers to the upper inter macro block, the error is not propagated. Accordingly, the image encoding unit 104 can prevent propagation of the error in the in-picture prediction process.

The image encoding unit 104 sets the following ranges to the search range of the motion vector in the y direction:

1) the macro block line as the horizontal line of the reference picture corresponding to the refresh line RL which is the processing target macro block (excluding the pixels (that is, the error propagation pixels) with the precision smaller than integer precision corresponding to the number of adjacent pixels referenced in the filter process from a reverse direction of the y direction); and 2) the macro block line formed by the displacement number from the macro block line of the reference picture corresponding to the refresh line RL of the reference picture (excluding the pixels (two boundary pixels) with the precision smaller than integer precision corresponding to the number of adjacent pixels referenced in the deblocking filter process from the downward direction of the y direction and the pixels (the pixels located outside by five pixels from the refresh boundary BD) with the precision smaller than integer precision corresponding to the pixels of an addition number obtained by adding the number of adjacent pixels (two pixels) referenced in the filter process of the motion prediction process and the number of pixels (two pixels) referenced to the deblocking filter process).

In this way, the image encoding unit 104 can set the search range of the motion vector from the maximum range as the range in which the error is not propagated upon decoding. That is, since the image encoding unit 104 can expand the search range of the motion vector in the range larger than the refresh block RL, it is possible to improve the encoding efficiency.

With such a configuration, the image encoding unit 104 executes the deblocking filter process except for the slice boundary BLfix and also moves the refresh line RL so as to be delayed by at least one macro block line. The image encoding unit 104 fixes the slice boundary BLfix and also executes the deblocking filter process except for the slice boundary BLfix by using disable_deblocking_filter_idc.

In this way, the image encoding unit 104 can prevent propagation of the error and thus shorten the time necessary for the recovery from the error, while improving the image quality by executing the deblocking filter process except for the slice boundary BLfix.

3. Third Exemplary Embodiment

In a third exemplary embodiment described with reference to FIGS. 22 to 25, the same reference numerals are given to the same portions as those of the first exemplary embodiment described with reference to FIGS. 2 to 14 and the same description is omitted. The third exemplary embodiment is different from the first exemplary embodiment in that the error is recovered not in the refresh line RL but in each refresh block RL-B.

3-1. Principle of the Third Exemplary Embodiment

Figure 22:
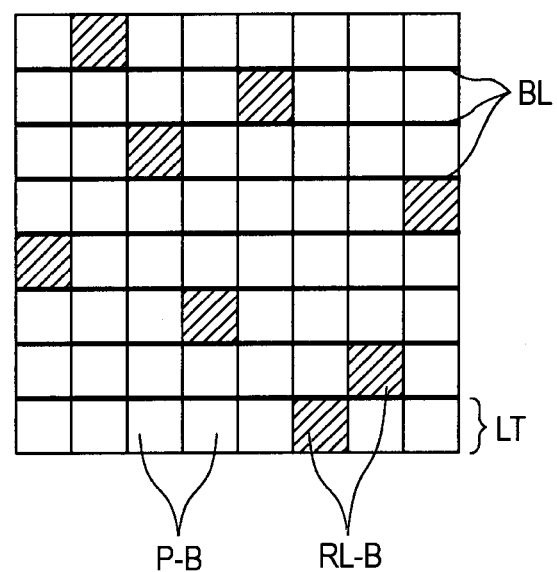
FIG. 22 is a diagram for explaining a principle of a random refresh method.

In this exemplary embodiment, as shown in FIG. 22, the picture is divided into the plurality of encoding block units (that is, the target blocks) and the compulsory intra macro block is determined in each encoding block unit. In the third exemplary embodiment, the error is recovered not in the refresh line RL but in each refresh block RL-B.

The refresh block RL-B is formed by an arbitrary organization number of macro blocks. The refresh block RL-B may be formed by the plurality of macro blocks such as 4×4 macro blocks or 8×8 macro blocks or by one macro block.

In this exemplary embodiment, the slice (that is, the sub-block) is formed in each row in which the encoding block units are arranged. A predetermined number of refresh blocks RL-B emerges for the slice. Accordingly, in this exemplary embodiment, the encoding amount can be made constant for each slice. Hereinafter, this slice is referenced to as a fixed code slice LT.

In this exemplary embodiment, the delay occurring in buffering at the time of wireless transmission can be reduced up to the fixed code slice LT.

In this exemplary embodiment, the refresh block RL-B emerges in each encoding block unit. The refresh block RL-B for each fixed code slice emerges periodically at each period T, but there is no regular rule regarding a positional relation of the refresh block RL-B. That is, the refresh block RL-B seems to emerge at random.

In general, the intra-encoded I macro block has the image quality better than that of the inter-encoded P macro block. In the first and second exemplary embodiments, since the compulsory intra macro block emerges in each refresh line RL, the difference between the image qualities of the compulsory intra macro block and the P macro block may be noticeable.

In this exemplary embodiment, by permitting the compulsory macro block to emerge in the relatively small encoding block unit, it is possible to barely notice the difference between the image qualities of the I macro block and the P macro block. Therefore, it is possible to improve the image quality of the picture. Hereinafter, the encoding method according to third to fifth exemplary embodiments is referred to as a random refresh method. This random refresh method is distinguished from the encoding method according to the first and second exemplary embodiments in which the compulsory intra macro block emerges in each refresh line RL.

3-2. Refresh in Each Macro Block

In this exemplary embodiment, a case where the refresh block RL-B is formed by one macro block will be described.

Figure 23:
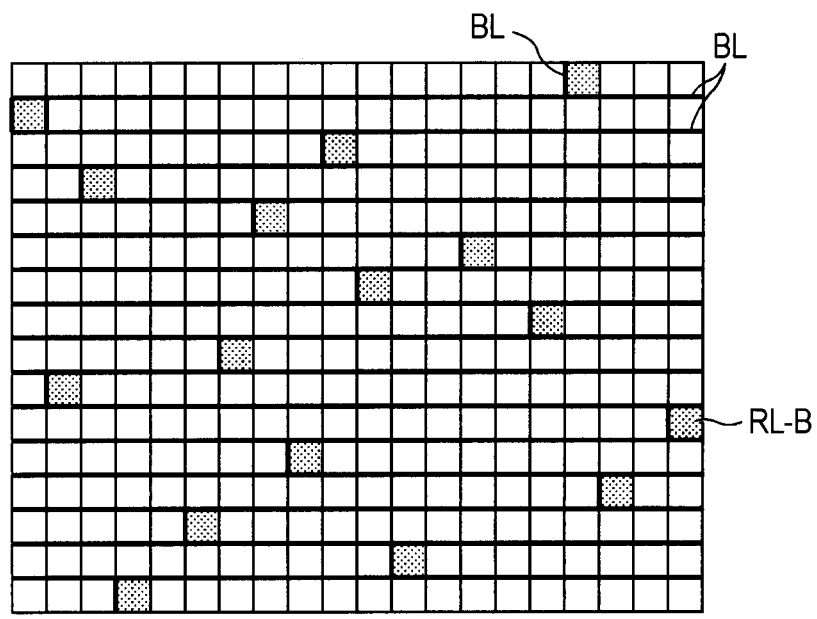
FIG. 23 is a diagram illustrating emergence of a refresh block in one macro block.

As shown in FIG. 23, an image encoding unit 204 forms the fixed code slice for each one macro block line (that is, for each target block) and permits the refresh block RL-B to emerge in each one macro block.

3-2-1. Avoiding First Error Propagation Cause

The search range setting section 16 of the image encoding unit 204 sets the search ranges in the x and y directions to "0". That is, the motion prediction compensation section 14 does not detect the motion vector. The motion vector is typically "0".

Accordingly, the motion prediction compensation section 14 supplies the pixel value of the macro block corresponding to the previous picture to the calculation section 13 without change. The calculation section 13 outputs a difference value between the pixel values of the processing target macro block and the macro block corresponding to the previous picture as the differential data L1.

In this way, the image encoding unit 204 can prevent propagation of the error from the unrecovered macro block (hereinafter, referred to as an unrecovered macro block UM).

3-2-2. Avoiding Second Error Propagation Cause

As in the first exemplary embodiment, by setting the refresh macro block RL-B to the head of the slice by the image encoding unit 204, it is possible to prevent propagation of the error from the unrecovered macro block UM in the in-picture prediction process.

Specifically, the picture header generating section 9 of the image encoding unit 204 sets the flag indicating the head of the refresh block RL-B is the head of the slice in the picture header to "true".

The slice division determining section 11 divides the slice before the refresh macro block RL-B, when the slice division determining section 11 confirms the flag indicating the head of the refresh block RL-B is the head of the slice. The slice division determining section 11 divides the slice in which the processing target macro block is located on the left end of the picture. That is, in FIG. 23, the fixed code slice LT is formed by two slices (that is, sub-blocks), that is, the slice including the refresh block RL-B and the slice including no refresh block RL-B.

The slice division determining section 11 executes the slice division in the middle portion (which is present immediately after the refresh block RL-B, for example) of the same macro block line, when the refresh block RL-B is located on the left end of the picture. In this way, the slice division determining section 11 can form the fixed code slice LT including two slices.

The intra prediction section 15 executes the in-picture prediction encoding without referring to the pixels on the upper and left sides of the refresh block RL-B, since the intra prediction section 15 does not refer to the pixels present beyond the slice.

In this way, the decoding unit 32 can recover the refresh block RL-B from the error by decoding the processing target macro block without referring to the unrecovered macro block UM.

3-2-3. Avoiding Third Error Propagation Cause

The slice header generating section 12 sets disable_deblocking_filter_idc=1, when the slice header generating section 12 generates the slice header. The deblocking filter 26 does not execute the deblocking filter process, when the deblocking filter 26 confirms the flag (that is, the indicator).

In this way, the image encoding unit 204 can prevent propagation of the error from the unrecovered macro block UM to the refresh line RL and thus can recover the refresh block RL-B from the error.

3-2-4. Processing Sequence

Figure 24:
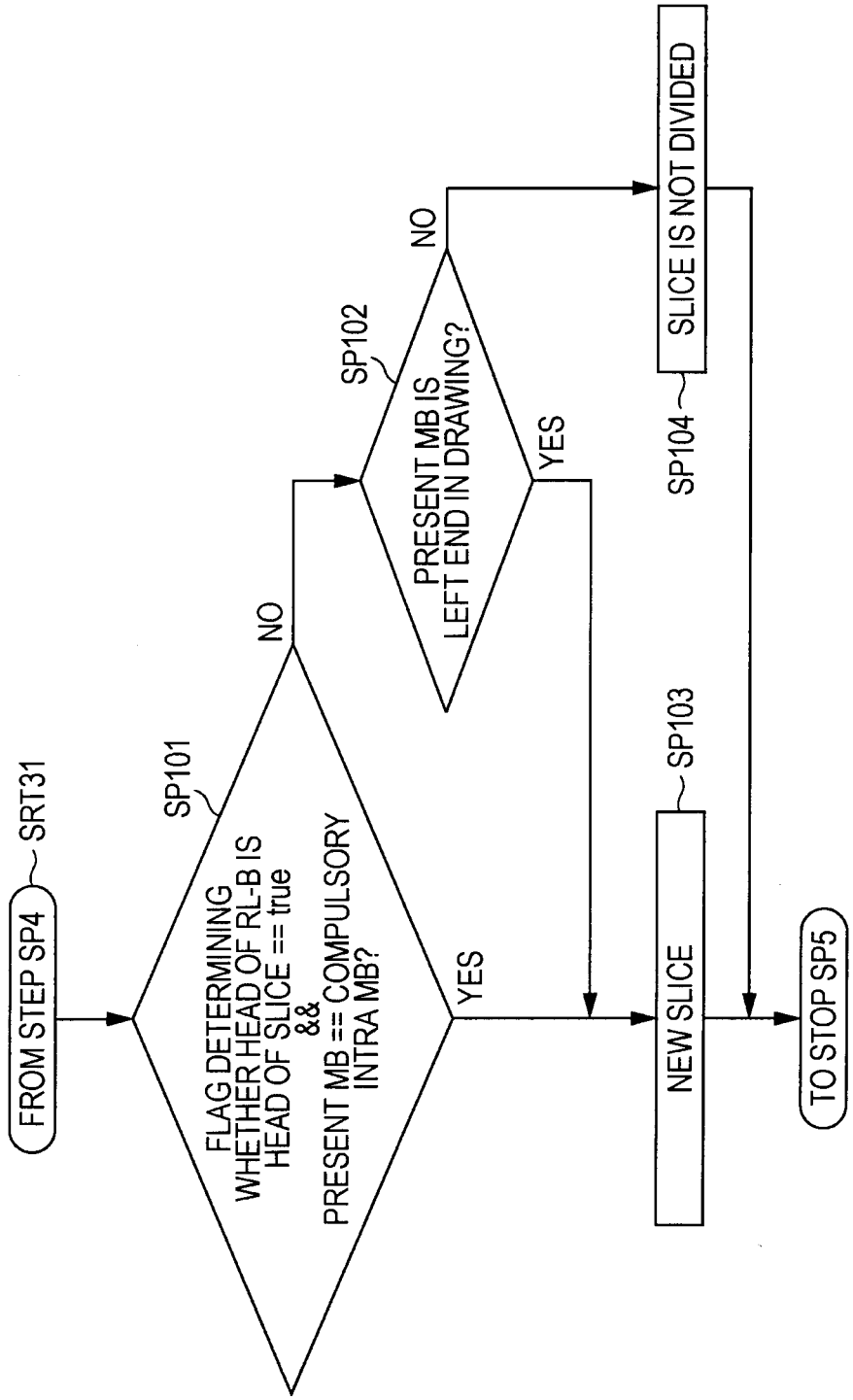
FIG. 24 is a flowchart illustrating the sequence of a slice division determining process according to a third exemplary embodiment.

Next, the processing sequence according to the third exemplary embodiment will be described with reference to the flowchart of FIG. 24. In the third exemplary embodiment, the encoding process sequence RT1 (see FIG. 11) is executed as in the first exemplary embodiment, but a sub-routine SRT31 is executed in step SP4 and a sub-routine SRT23 is executed in step SP7. Hereinafter, the sub-routines SRT31 and SRT23 will be described.

The process proceeds from step SP4 of the encoding process sequence RT1 (see FIG. 11) to step SP101 of the sub-routine SRT24 (see FIG. 24), and the image encoding unit 204 executes the slice division determining process.

In step SP101, the image encoding unit 204 determines whether the processing target macro block satisfies all the following two conditions:

1) the flag determining whether the head of the refresh block RL-B is the head of the slice is "true"; and 2) the processing target macro block is the compulsory intra macro block.

When a positive result is obtained, this result means that the processing target macro block indicates the refresh block RL-B and thus the slice has to be divided immediately before the processing target macro block. Then, the image encoding unit 204 permits the process to proceed to the next step SP102.

In step SP102, the image encoding unit 204 determines whether the processing target macro block is located on the left end of the picture. When a positive result is obtained, the process proceeds to step SP103. Alternatively, when a negative result is obtained, the process proceeds to step SP104.

In step SP103, the image encoding unit 204 executes the slice division so that a new slice (that is, a sub-block) is formed from the processing target macro block. At this time, the image encoding unit 204 set disable_deblocking_filter_idc. Then, the image encoding unit 204 permits the process to proceeds to step SP5 of the encoding process sequence RT1 (see FIG. 11).

In step SP104, the image encoding unit 204 does not execute the slice division, and the process proceeds to step SP5 of the encoding process sequence RT1 (see FIG. 11).

In step SP7, the image encoding unit 204 permits the process to proceed to step SP81 of the sub-routine SRT23 indicating the sequence of the search range setting process.

In step SP81, the image encoding unit 204 sets the range in which the error is not propagated, and then the process proceeds to step SP8 of the encoding process sequence RT1 (see FIG. 11). In the third exemplary embodiment, the range in which the error is not propagated means the search ranges in the x and y directions="0".

In step SP8, the image encoding unit 204 executes the motion prediction (that is, calculates the difference value from the previous picture) as the motion vector of "0".

3-2-5. Operation and Advantage

With such a configuration, the image encoding unit 204 executes the slice division in each fixed code slice LT formed from the macro block line of an integer. The image encoding unit 204 allocates the compulsory macro blocks so that the compulsory intra macro emerges in each refresh block RL-B formed by the organization number of the macro blocks and emerges by the emergence number for the fixed code slice LT.

In this way, since the image encoding unit 204 can unify each code amount of fixed code slice LT, the image encoding unit 204 can reduce the delay necessary for buffering up to the size of the fixed code slice LT.

The image encoding unit 204 forms the fixed code slice LT by arranging the single macro block in the x direction and thus form the refresh block RL by the single macro block.

In this way, since the image encoding unit 204 can form the fixed code slice LT as one macro block line, the image encoding unit 204 can permit the delay to be one macro block line.

The image encoding unit 204 allocates the compulsory intra macro block in the picture at random.

In this way, since the image encoding unit 204 permits the I macro block to be intra-encoded and the P macro block to be inter-encoded to emerge at random, it is possible to barely notice the difference in the image quality by the intra encoding.

The image encoding unit 204 permits the head of the compulsory intra macro block to be the head of the slice and sets the search ranges of the motion vector in the x and y directions to "0".

In this way, the image encoding unit 204 can prevent propagation of the error caused by the motion prediction process upon decoding.

With such a configuration, the image encoding unit 204 permits the refresh block RL-B to emerge in each fixed code slice LT. In this way, the image encoding unit 204 can prevent propagation of the error and reduce the delay, while shortening the time necessary for the recovery from the error.

4. Fourth Exemplary Embodiment

Figure 25:
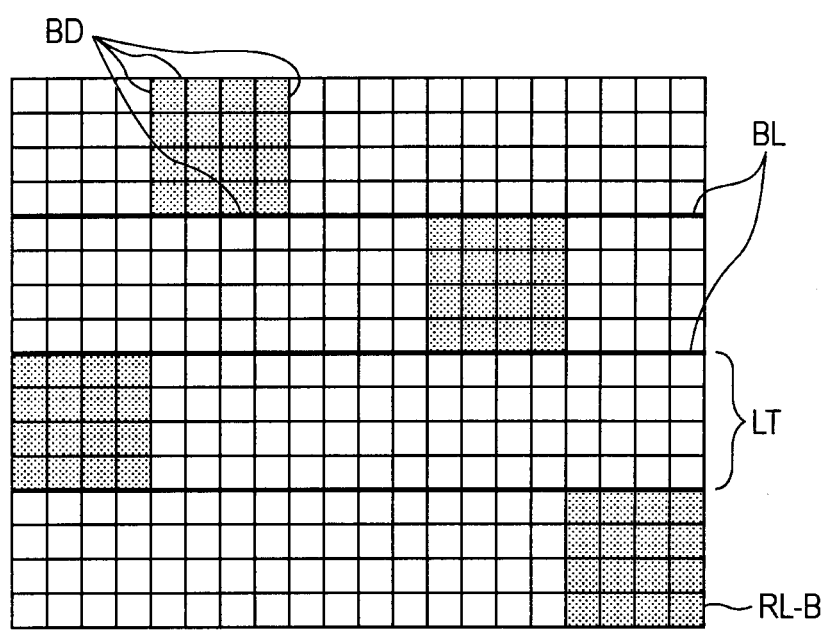
FIG. 25 is a diagram illustrating emergence of the refresh block in the plurality of macro blocks, according to a fourth exemplary embodiment.

In a fourth exemplary embodiment described with reference to FIG. 25, the same reference numerals are given to the same portions as those of the third exemplary embodiment described with reference to FIGS. 22 to 24 and the same description is omitted. The fourth exemplary embodiment is different from the third exemplary embodiment in that the refresh block RL-B is organized by not one macro block, but a plurality of macro blocks.

4-1. Avoiding First Error Propagation Cause

In the first exemplary embodiment, since the refresh line RL emerges in each macro block line, it is not necessary to impose restrictions on the search range of the motion vector in the x direction. In this exemplary embodiment, since the unrecovered macro block UM is not referenced, it is necessary to impose the same restrictions on the search range in both the x direction and the y direction.

The search range setting section 16 of an image encoding unit 304 sets the search ranges of motion vectors MVx and MVy in the x and y directions, respectively, to the range which is within the encoding block unit and excludes the half pixels and the quarter pixels located on the side of the refresh boundary BD outside (that is, displaced) by three pixels from the encoding block unit.

The macro block determining section 11 permits the refresh macro block RL-B so as to be deviated to the right side between pictures. Therefore, the decoding unit 32 can refer to the recovered block on the right side of the inter-encoded encoding block unit after the emergence of the refresh macro block RL-B.

Accordingly, the search range setting section 16 can set the range to the refresh boundary BD on the right side of the encoding block unit as the search range.

In this way, the image encoding unit 304 can prevent propagation of the error from the unrecovered macro block UM. Since the image encoding unit 304 can detect the motion vector, it is possible to further improve the encoding efficiency, compared to the third exemplary embodiment in which the refresh block RL-B emerges in each macro block.

4-2. Avoiding Second Error Propagation Cause

The refresh block RL-B overlaps with the plurality of macro block lines. Therefore, as in the third exemplary embodiment, in order to permit the refresh block RL-B to be the head of the slice, it is necessary to execute the slice division in each macro block line. In this exemplary embodiment, by using constrained_intra_pred_flag to reduce the number of divided slices, the second error propagation cause is avoided.

The picture header generating section 9 of the image encoding unit 304 sets constrained_intra_pred_flag=1 in PPS (Picture Parameter Set) of the picture header. The fact that the flag is set to "1" means that the pixel inter-encoded for the intra code is not referenced.

The intra prediction section 15 executes the in-picture prediction process with reference to only the intra-encoded pixels, when the intra prediction section 15 confirms constrained_intra_pred_flag=1. As a consequence, since the decoding unit 32 can decode the image data S4 with reference to only the intra-encoded pixels, it is possible to prevent propagation of the error from the unrecovered line UR.

In this way, by setting constrained_intra_pred_flag=1 by the image encoding unit 304, it is possible to prevent propagation of the error from the unrecovered line UR. Moreover, the image encoding unit 304 can refer to the macro blocks adjacent to the second macro block and the macro blocks subsequent to the second macro block of the refresh block RL-B. Accordingly, the image encoding unit 304 can further improve the encoding efficiency, compared to the third exemplary embodiment in which the refresh block RL-B emerges in each one macro block.

In this way, since the decoding unit 32 decodes the processing target macro block without referring to the unrecovered macro block UM, it is possible to recover the refresh block RL-B from the error.

4-3. Avoiding Third Error Propagation Cause

The slice header generating section 12 sets disable_deblocking_filter_idc=1, when the slice header generating section 12 generates the slice header. The deblocking filter 26 does not execute the deblocking filter process on all of the slices, when the deblocking filter 26 confirms this flag.

In this way, since the image encoding unit 304 can prevent propagation of the error to the unrecovered block UM in the deblocking filter process, it is possible to recover the refresh block RL-B from the error.

The emergence number of refresh blocks RL-B in the fixed code slice LT may be one or plural. By increasing the emergence number of refresh blocks RL-B and shortening the period T, it is possible to advance the recovery from the error. On the contrary, by decreasing the emergence number of refresh blocks RL-B and increasing the ratio of the inter macro blocks, the encoding efficiency can be improved.

In this way, by enlarging the size of the encoding block unit and increasing the search range of the motion vector, it is possible to improve the encoding efficiency. On the contrary, by decreasing the size of the encoding block unit and decreasing the fixed code slice LT, it is possible to reduce the delay and to rarely notice the difference between the image qualities of the intra block and the inter block.

In an exemplary embodiment, the size of the encoding block unit and the emergence number of refresh blocks RL-B may be appropriately selected in consideration of the above description.

In this way, the image encoding unit 304 permits the refresh block RL-B to emerge in the plurality of macro block units and expands the reference target in the motion prediction process and the in-picture prediction encoding process. Therefore, it is possible to improve the encoding efficiency.

4-4. Operation and Advantage

In this way, the image encoding unit 304 forms the fixed code slice LT organized by the plurality of macro blocks in the y direction and forms the refresh block RL-B organized by the plurality of macro blocks. The image encoding unit 304 sets constrained_intra_pred_flag to "1".

In this way, the image encoding unit 304 can prevent propagation of the error upon decoding, reduce the number of divided slices, and improve the encoding efficiency by expanding the range of the reference target block in the in-picture prediction process and the motion prediction process.

The image encoding unit 304 allocates the compulsory intra blocks so that the refresh block RL-B is displaced to the horizontal right side (the right side in the x direction) between pictures.

In this way, the image encoding unit 304 makes the refresh block RL-B adjacent to each other between pictures and thus can set the search range to the refresh boundary BD on the right side of the refresh block RL-B in the x direction. Accordingly, the image encoding unit 304 can improve the encoding efficiency by expanding the search range.

The image encoding unit 304 sets the refresh block (excluding the pixels with the precision smaller than integer precision corresponding to the number of adjacent pixels referenced in the filter process from the boundary between the refresh blocks except for the right side in the x direction) of the reference picture to the search range.

In this way, the image encoding unit 304 can prevent propagation of the error in the motion prediction process upon decoding.

With such a configuration, the image encoding unit 304 forms the refresh block RL-B organized by the plurality of macro blocks. Accordingly, it is possible to improve the encoding efficiency by expanding the reference target block and decreasing the number of slices, while suppressing the delay.

5. Fifth Exemplary Embodiment

In a fifth exemplary embodiment described with reference to FIGS. 26A and 26B, the same reference numerals are given to the same portions as those shown in FIG. 25 in the fourth exemplary embodiment and the same description is omitted. The fifth exemplary embodiment is different from the fourth exemplary embodiment in that one macro block line is set to the fixed code slice LT and the deblocking filter process is executed.

5-1. Advantage of the Fifth Exemplary Embodiment

In this exemplary embodiment, an image encoding unit 404 executes the slice division on each one macro block line and also executes the slice division in the head of the refresh block RL-B. That is, as in the third exemplary embodiment, the image encoding unit 404 can reduce the delay, since the image encoding unit 404 can set one macro block line to the fixed code slice LT.

Figure 26A:
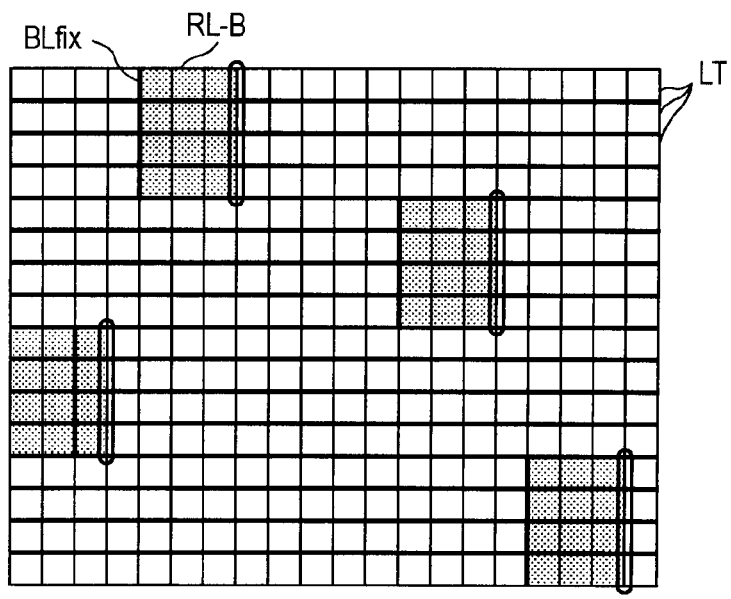
FIGS. 26A and 26B are diagrams for explaining avoidance of a third error propagation cause according to a fifth exemplary embodiment.
Figure 26B:
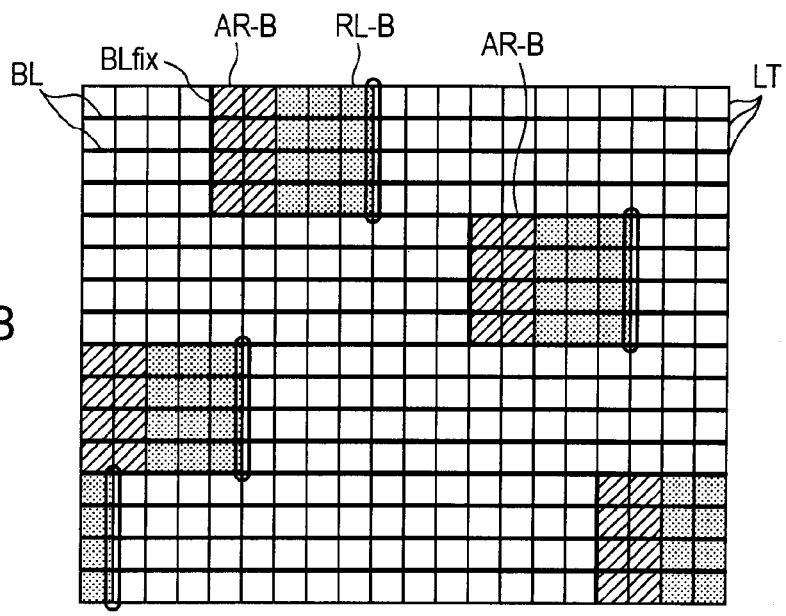

In this exemplary embodiment, as shown in FIGS. 26A and 26B, the refresh block RL-B emerges in each 4×3 macro block, for example.

In this way, the image encoding unit 404 can improve the encoding efficiency by expanding the reference range in the motion prediction process and the in-picture prediction process, as in the fourth exemplary embodiment.

5-2. Avoiding Third Error Propagation Cause

The slice header generating section 12 of the image encoding unit 404 sets disable_deblocking_filter_idc=2, when the slice header generating section 12 generates the slice header. The deblocking filter 26 does not execute the deblocking filter process on the slice boundary BL, when the deblocking filter 26 confirms this flag.

The slice division determining section 11 of the image encoding unit 404 typically executes the slice division at the fixed position inside each macro block line (inside the fixed code slice LT). The fixed code slice LT in which the same refresh block RL-B emerges is subjected to the slice division at the same position in the x direction. As a consequence, the slice boundary BLfix is generated along the left end of the refresh block RL-B of a given picture.

Due to the influence of the deblocking filter process, two pixels on the right side of the refresh block RL-B which are located in the slice boundary are destroyed (indicated by an enclosure). Therefore, as show in FIG. 26B, the intra macro block determining section 10 permits only two macro blocks of the refresh block RL-B to emerge at the position delayed on the right side so that the macro blocks with the destroyed pixels overlap with each other.

Accordingly, the decoding unit 32 can appropriately recover the macro block destroyed in the deblocking filter process of using the unrecovered block UR-B when the error occurs.

In this way, the image encoding unit 404 permits the refresh block RL-B in the plurality of block units to emerge, while forming the fixed code slice in each one macro block line. In this way, the image encoding unit 404 can improve the encoding efficiency by increasing the reference target block by the motion prediction and the in-picture prediction encoding and also can reduce the delay.

5-3. Operation and Advantage

The image encoding unit 404 with the above configuration forms the fixed code slice LT by arranging the single encoding unit horizontally. The image encoding unit 404 forms the refresh block RL-B by arranging the compulsory intra macro blocks at the same position in the x direction in the plurality of fixed code slice LT.

In this way, the image encoding unit 404 can form the refresh block RL-B beyond the fixed code slice LT formed in each one macro block line. That is, the image encoding unit 404 can suppress the delay by decreasing the fixed code slice LT and also can improve the encoding efficiency by increasing the refresh block RL-B and expanding the reference target block.

The image encoding unit 404 allocates the compulsory intra macro blocks so that one or more macro blocks overlap with each other in the refresh block RL-B between pictures. The image encoding unit 404 sets disable_deblocking_filter_idc to "2".

As in the second exemplary embodiment, the image encoding unit 404 can execute the deblocking filter process at the portion except for the slice boundary BL, while recovering the macro block destroyed in the deblocking filter process in the next picture. Therefore, it is possible to improve the image quality.

The image encoding unit 404 permits the head of the refresh block RL-B in each fixed code slice LT to become the head of the refresh block RL-B.

In this way, as in the second exemplary embodiment, the image encoding unit 404 prevents the propagation of the error in the in-picture prediction process and the deblocking filter process upon decoding.

With such a configuration, the image encoding unit 404 forms the refresh block RL-B organized by the macro blocks more than the fixed code slices LT in the y direction beyond the fixed code slices LT.

In this way, the image encoding unit 404 can improve the encoding efficiency by reducing the delay in the buffering and expanding the reference target block.

6. Other Exemplary Embodiments

In the above-described first exemplary embodiment, the case has been described in which the half pixels and the quarter pixels are generated only in the x direction. However, the disclosed exemplary embodiments are not limited thereto. The half pixels and the quarter pixels may be generated also in the y direction, but the search may be executed in the x direction. Alternatively, the half pixels and the quarter pixels are generated also in the y direction and the half pixels and the quarter pixels in the y direction may be deleted later.

In the above-described exemplary embodiments, the case has been described in which the motion vector MVy=0 is satisfied in the case of the encoding line unit=1. However, the disclosed exemplary embodiments not limited thereto. The motion vector in the y direction may be searched in the same process in a case of the encoding line unit=2, when the size of a motion search block for search is 16×8, 8×8, 8×4, 4×8, and 4×4.

In the above-described first and second exemplary embodiments, the case has been described in which one refresh line RL emerges in one picture. However, the disclosed exemplary embodiments are not limited thereto. The plurality of refresh lines RL may emerge in one picture. In the exemplary embodiments, the encoding efficiency can be adjusted by the frequency of the emergence of the refresh line RL.

In the above-described third to fifth exemplary embodiments, the case has been described in which one refresh block RL-B emerges in one fixed code amount line. However, the disclosed exemplary embodiments are not limited thereto. The plurality of refresh blocks RL-B may emerge in one fixed code amount line. In the exemplary embodiments, the encoding efficiency can be adjusted by the frequency of the emergence of the refresh line RL-B.

In the above-described exemplary embodiments, the case has been described in which the encoding method is determined in each macro block formed by 16×16 pixels as the encoding unit. However, the invention is not limited thereto. The size of the encoding unit is not limited.

In the above-described exemplary embodiments, the case has been described in which the other blocks are allocated to the inter blocks and the intra blocks. However, the disclosed exemplary embodiments are not limited thereto. For example, all of the other blocks may be allocated to the inter blocks.

In the above-described exemplary embodiments, the case has been described in which the in-picture prediction process is executed on the compulsory intra block. However, the disclosed exemplary embodiments are not limited thereto. For example, the pixel value may be encoded without change. The in-picture prediction process may not be necessarily executed.

In the above-described exemplary embodiments, the case has been described in which the deblocking filter process is restricted by using disable_deblocking_filter_idc. However, the disclosed exemplary embodiments are not limited thereto. The restriction method is not limited.

In the above-described exemplary embodiments, the case has been described in which the refresh line RL is displaced in the downward direction of the x direction as the displacement direction. However, the disclosed exemplary embodiments are not limited thereto. The refresh line RL may be displaced in the upward direction of the x direction. In this case, in an exemplary embodiment, the search range for the motion vector in the y direction is set in the downward direction of the x direction which is a direction reverse to the displacement direction so as not to contain the half pixels and the quarter pixels corresponding to the adjacent pixels of the refresh boundary BD. In the exemplary embodiments, the same advantages as those of the above-described exemplary embodiments are obtained.

In the above-described exemplary embodiments, the case has been described in which the encoding process is executed in conformity with H.264/AVC. However, the disclosed exemplary embodiments are not limited thereto. The encoding process may be executed in conformity with any encoding method in which the motion prediction process and the deblocking filter process are executed at the precision smaller than integer precision with reference to at least the adjacent pixels.

In the above-described first exemplary embodiment, the case has been described in which the refresh lines RL are sequentially displaced between pictures. However, the disclosed exemplary embodiments are not limited thereto. The refresh lines RL may be displaced at random.

In the above-described third to fifth exemplary embodiments, the case has been described in which the refresh block RL emerges at random in the picture. However, the disclosed exemplary embodiments are not limited thereto. The refresh block RL may emerge by certain rule.

In the above-described exemplary embodiments, the case has been described in which the refresh block RL-B is displaced in the right direction of the x direction which is the horizontal right direction between pictures. However, the disclosed exemplary embodiments are not limited thereto. The refresh block RL-B may be displaced in the left direction of the x direction. The refresh block RL-B may not be necessarily displaced regularly, but may be displaced at random.

In the above-described first exemplary embodiment, the case has been described in which one macro block line is the fixed code amount line LT. However, the disclosed exemplary embodiments are not limited thereto. For example, the half line may be the fixed code amount line LT. Therefore, it is possible to further reduce the delay.

In the above-described second exemplary embodiment, the case has been described in which the refresh line RL is displaced so that one encoding line unit overlaps between pictures. However, the disclosed exemplary embodiments are not limited thereto. At least one macro block line may overlap. For example, two or more encoding line units may overlap. Alternatively, it is not necessary to make each encoding line unit overlap, but the refresh line RL may emerge in the encoding line unit in addition to one macro block.

In the above-described fifth exemplary embodiment, the case has been described in which the refresh block RL-B is displaced so that only one macro block overlap between pictures. However, the disclosed exemplary embodiments are not limited thereto. The refresh block RL-B may be displaced by at least one macro block or two or more macro blocks.

In the above-described exemplary embodiments, the case has been described in which only the previous picture is referenced upon the inter encoding. However, the disclosed exemplary embodiments are not limited thereto. The forward picture may be referenced. For example, the picture previous to two pictures may be referenced.

In the above-described exemplary embodiments, the case has been described in which two pixels are referenced as the adjacent pixel by the FIR filter of 6 TAP upon the inter encoding. However, the disclosed exemplary embodiments are not limited thereto. The number of filter taps is not limited. For example, one adjacent pixel or three or more pixels may be referenced.

In the above-described exemplary embodiments, the case has been described in which two adjacent pixels are referenced in the deblocking filter process. However, the disclosed exemplary embodiments are not limited thereto. The number of pixels referenced is not limited.

In the above-described exemplary embodiments, the case has been described in which the wireless image data transmitting system is applied a wall-hung television. However, the disclosed exemplary embodiments are not limited thereto. The invention is applicable to any system capable of transmitting image data wirelessly and displaying the image data in real time.

In the above-described exemplary embodiments, the case has been described in which IEEE 802.11n is used as the wireless transmitting method. However, the disclosed exemplary embodiments are not limited thereto. The wireless transmitting method is not limited.

In the above-described third to fifth exemplary embodiments, the case has been described in which H.264/AVC is applied. However, the disclosed exemplary embodiments are not limited thereto. For example, various encoding methods such as MPEG-2 may be applied. That is, there may be provided: a receiver receiving image data organized by a plurality of pictures; a compulsory intra block allocator allocating encoding units to compulsory intra blocks or other blocks except for the compulsory intra blocks so that all of the encoding units become the compulsory intra blocks to be intra-encoded in the picture at a certain period, when the image data received by the receiver is encoded by intra encoding and forward inter encoding; a slice divider dividing a slice in each certain code amount to form a fixed code slice; an intra encoder intra-encoding the compulsory intra blocks allocated by the compulsory intra block allocator; and an inter encoder inter-encoding an inter block to be inter-encoded. In this way, according to an exemplary embodiment, by applying a random refresh method by MPEG-2, it is possible to reduce the delay.

In the above-described exemplary embodiments, the case has been described in which an encoding program is stored on a ROM or a hard disk drive, and is executed by a processor coupled to the storage device. However, the disclosed exemplary embodiments are not limited thereto. The encoding program may be installed from an external memory medium such as Memory Stick (registered trademark of Sony Corporation) to a flash memory. Alternatively, the encoding program or the like may be acquired from the outside via a USB (Universal Serial Bus) or a wireless LAN (Local Area Network) such as Ethernet (registered trademark) IEEE (Institute of Electrical and Electronics Engineers) 802.11 a/b/g and may be delivered by a digital terrestrial television broadcast or a BS digital television broadcast.

In the above-described exemplary embodiments, the case has been described in which the image processing apparatus 1 includes the buffer 8 serving as a receiver, the intra macro block determining section 10 serving as a compulsory intra block allocator, the search range setting section 16 serving as a search range setting unit, a motion prediction compensation section 14 serving as a motion predictor, the slice header generating section 12 serving as a deblocking filter restrainer, and the deblocking filter 26 as a deblocking filter. The image processing apparatus according to the exemplary embodiments may include only the image encoding unit 4, for example, as long as the image processing apparatus includes the receiver, the compulsory intra block allocator, the search range setting unit, the motion predictor, and the deblocking filter restrainer, and the deblocking filter. According to an exemplary embodiment, the image processing apparatus may have various configurations. For example, the image processing apparatus may include the receiver, the compulsory intra block allocator, the search range setting unit, the motion predictor, the deblocking filter restrainer, and the deblocking filter.

The present application contains subject matter related to that disclosed in Japanese Priority Patent Application JP 2009-176701 filed in the Japan Patent Office on Jul. 29, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A computer-implemented method for processing an image, the method comprising the steps, performed by a processor, of:
receiving information associated with a plurality of pixels of the image, the pixels being disposed within a plurality of pixel blocks;
selecting one of the pixel blocks as a target block;
computing a motion vector associated with a translation of pixels of a portion of the target block from reference positions in a previously-encoded image, the computing comprising:
selecting a portion of the pixels of the previously-encoded image as a search range, the search range excluding a pixel of the previously-encoded image that constitutes an error; and
computing the motion vector within the search range at a precision greater than integer precision;
computing predicted image data for the pixels of the target block based on at least the received information and the motion vector;
filtering the predicted image data according to a predetermined process, wherein the filtering comprises:
identifying a boundary pixel associated with a boundary of the portion of the target block, and an adjacent pixel disposed adjacent to the boundary pixel; and
applying the process to the predicted image data associated with the adjacent pixel,
identifying, within the target block, a pixel of a refresh block associated with the previously-encoded image;
selecting a subset of the pixels of the target block as a sub-block, the sub-block comprising a header portion that includes the pixel of the refresh block; and
computing predicted image data for the pixels of the sub-block based on at least received information associated with the pixel of the refresh block.

2. The method of claim 1, wherein computing the predicted image data comprises:
computing predicted image data for pixels of the header portion based on the received information associated with the pixel of the refresh block.

3. The method of claim 2, wherein computing the predicted image data for the header portion comprises:
detecting an indicator associated with the target block; and
determining that a value of the indicator corresponds to a predetermined value.

4. The method of claim 2, further comprising:
computing the predicted image data for the pixels of the target block based on at least received information associated with the pixel of the refresh block, and information associated with the pixel recovered from the previously-encoded image.

5. An apparatus for processing an image, the apparatus comprising:
a storage device; and
a processor coupled to the storage device, wherein the storage device stores a program for controlling the processor, the processor being operative with the program to cause the apparatus to:
receive information associated with a plurality of pixels of the image, the pixels being disposed within a plurality of pixel blocks;
select one of the pixel blocks as a target block;
compute a motion vector associated with a translation of pixels of a portion of the target block from reference positions in a previously-encoded image, the processor being further operative to cause the apparatus to:
select a portion of the pixels of the previously-encoded image as a search range, the search range excluding a pixel of the previously-encoded image that constitutes an error; and
compute the motion vector within the search range at a precision greater than integer precision;
compute predicted image data for the pixels of the target block based on at least the received information and the motion vector; and
filter the predicted image data according to a predetermined process, the processor being further operative to cause the apparatus to:
identify a boundary pixel associated with a boundary of the portion of the target block, and an adjacent pixel disposed adjacent to the boundary pixel; and
apply the process to the predicted image data associated with the adjacent pixel;
identifying, within the target block, a pixel of a refresh block associated with the previously-encoded image;
selecting a subset of the pixels of the target block as a sub-block, the sub-block comprising a header portion that includes the pixel of the refresh block; and
computing predicted image data for the pixels of the sub-block based on at least received information associated with the pixel of the refresh block.

6. A non-transitory computer-readable medium storing instructions that, when executed by a processor, perform a method for processing an image, the method comprising the steps of:
receiving information associated with a plurality of pixels of the image, the pixels being disposed within a plurality of pixel blocks;
selecting one of the pixel blocks as a target block;
computing a motion vector associated with a translation of pixels of a portion of the target block from reference positions in a previously-encoded image, the computing comprising:
selecting a portion of the pixels of the previously-encoded image as a search range, the search range excluding a pixel of the previously-encoded image that constitutes an error; and
computing the motion vector within the search range at a precision greater than integer precision;
computing predicted image data for the pixels of the target block based on at least the received information and the motion vector; and
filtering the predicted image data according to a predetermined process, wherein the filtering comprises:
identifying a boundary pixel associated with a boundary of the portion of the target block, and an adjacent pixel disposed adjacent to the boundary pixel; and
applying the process to the predicted image data associated with the adjacent pixel;
identifying, within the target block, a pixel of a refresh block associated with the previously-encoded image;
selecting a subset of the pixels of the target block as a sub-block, the sub-block comprising a header portion that includes the pixel of the refresh block; and
computing predicted image data for the pixels of the sub-block based on at least received information associated with the pixel of the refresh block.

* * * * *